United States Patent [19]
Shoji et al.

[11] Patent Number: 5,321,843
[45] Date of Patent: Jun. 14, 1994

[54] INFORMATION RETRIEVAL APPARATUS AND INFORMATION EDITING SYSTEM USING THE SAME

[75] Inventors: Wataru Shoji; Daisuke Tabuchi; Ichiro Nakajima, all of Tokyo, Japan

[73] Assignee: Kabushiki Kaisha Dainichi, Tokyo, Japan

[21] Appl. No.: 761,905

[22] PCT Filed: Mar. 14, 1990

[86] PCT No.: PCT/JP90/00330
§ 371 Date: Sep. 12, 1991
§ 102(e) Date: Sep. 12, 1991

[87] PCT Pub. No.: WO90/10912
PCT Pub. Date: Sep. 20, 1990

[30] Foreign Application Priority Data
Mar. 14, 1989 [JP] Japan .................................. 1-61585

[51] Int. Cl.$^5$ .............................................. G06F 15/40
[52] U.S. Cl. ................................. 395/800; 364/225.6; 364/943
[58] Field of Search .............. 395/425, 725, 775, 800

[56] References Cited
U.S. PATENT DOCUMENTS
3,611,316 10/1971 Woodrum .......................... 395/800
3,701,972 10/1972 Berkeley ............................ 395/200
3,864,669 2/1975 Schlickeiser et al. ............... 395/111

FOREIGN PATENT DOCUMENTS
0233401 8/1987 European Pat. Off. ...... G06F 15/40
58-134336 8/1983 Japan .............................. G06F 7/28
61-267825 11/1986 Japan .............................. G06F 7/28
61-271535 12/1986 Japan .............................. G06F 7/28

OTHER PUBLICATIONS
International Conference on Data Engineering, 27 Apr. 1984, Los Angeles, Calif., USA, pp. 167-174, Kwang-I Yu "*The Fast Data Finder-An Architecture for Very High Speed Data Search and Dissemination*".
IEEE Transactions on Computers, vol. C-35, No. 12, Dec. 1986 New York, USA, pp. 1077-1082, Sakti Pramanik "*Performance Analysis of a Database Filter Search Hardware*".

*Primary Examiner*—David Y. Eng
*Attorney, Agent, or Firm*—Beveridge, DeGrandi, Weilacher & Young

[57] ABSTRACT

An apparatus for retrieving the desired information from files provided with a shift register (294) having a predetermined number of stages for receiving and transferring the data read out of files, a key register (292) having a predetermined number of stages for registering the retrieval key, a comparator (296) for comparing each data in the key register with each dater in the corresponding shift register, and a logical operation circuit (297) which generates and outputs a match signal relating to the coincidence or mismatch of the retrieval key in the key register with a data array in the corresponding shift register.

11 Claims, 17 Drawing Sheets

INFORMATION RETRIEVAL APPARATUS AND INFORMATION EDITING SYSTEM USING THE SAME

TECHNICAL FIELD

This invention relates to an information retrieval apparatus for retrieving the desired information from files.

TECHNICAL BACKGROUND

So far information retrieval using computers has been in general carried out. In the information retrieval using computers, each processing is executed according to software (programs). Consequently, in the execution of individual processing it is required to take many steps such as the read and interpretation of programs from memory, the read of data from files and the write of calculation results into memory. Thus, even in the simplest procedure, processing time which is five to six times as long as the memory access time is required and the procedures requiring over several-thousand times the access time are not scarce. As a result, despite numerous improvements that have sofar been made to softwares and hardwares, in the retrieval apparatus using computers, those having a satisfactory high speed, that is, those capable of extracting desired information out of voluminous information groups almost instantly have not yet been realized.

In the past, to compensate for the slow-speed software processing, preconstituting the files in the form that conform to the retrieval mode has been generally executed. The files constituted into such a special form is called a data base. However, the data base has such a demerit that its form limits the retrievable range, thus susceptible to overlooking the information. For example, assume that a data base divided into blocks according to each person's name has been configured pursuant to the retrieval mode of extracting the information concerning a person with the person's name as a key. When a retrieval has been conducted with a specific person's name as a key, the block of the person's name will be detected, and the information recorded in the block will be taken out However, because the block of other person's name cannot be discovered, even if the information related to the person keyed in that block has been recorded, it is not possible to find out the information.

Thus, because the conventional information retrieval apparatus conducts the processing using software, a satisfactory high-speed retrieval was not available sofar. Further, to compensate for the low speed, a database of specific form needs to be configured. However, the retrievable range will be restricted thereby, and there was a fear of overlooking the information.

Therefore, the major purpose of this invention is to achieve a satisfactory retrieval of extremely high speed by means of hardware alone without relying on software.

A secondary purpose of this invention is to make the whole range of files retrievable in a short time through an extremely high retrieval speed, thus obviating the need for the data-base fabrication and also eliminating the possibility of overlooking the information. Another secondary purpose of this invention is to make possible the extraction of desired information from voluminous information groups in a short time with an extremely high retrieval speed, thereby enabling simply the realization of a high-grade information processing system, for example, an expert system, a voice recognition apparatus and an automatic translation machine which hitherto needed complex software, without using high-grade softwares.

DISCLOSURE OF THE INVENTION

This invention offers an information retrieval system equipped with a shift register having a predetermined number of stages which accept and transfer the data constituting a file is due order, a key register having a predetermined number of stages for registering the retrieval key, a comparator to compare each data within the key register with each data within the corresponding shift register respectively and a logic operation circuit which, based on each comparison-result signal output from the comparator, creates and outputs the match signal relating to the agreement or disagreement between the retrieval key within the key register and the data array within the corresponding shift register.

In this system, the data constituting the file are input into the shift register in due order and transferred within it. In parallel with this, comparison is made by the comparator between the data arrays in the shift register and the corresponding data arrays in the key register. The results of each comparison are input to the logic operation system where the prescribed logical operation is performed on each comparison result to create the match signal. This match signal is a signal to show whether or not a data array matching the retrieval key exists or existed within the shift register. Thus, since all retrieval procedures are performed with hardware without relying on software, an extremely high processing speed can be obtained.

The retrieval apparatus of this invention has, to be appropriate, in addition to the foregoing configuration, a mask register for registering the mask data with a predetermined number of bits.

And the logic unit is made up so as to create a match signal by applying a prescribed logical operation to the comparison result signal from the comparator and the mask data from the mask register.

More preferably, it is equipped with the file memory for storing files, the address memory for storing the address of the file memory, the data transmission route for delivering the data read out of the file memory to the shift register data input terminal, the address transmission line for affording the file memory address signal to the address memory data terminal and the address memory control circuit which affords a write command to the address memory in connection with the match signal.

Furthermore this invention can offer a system having a plurality of retrieval units each incorporating the aforementioned key register, shift register, comparator and logic operation circuit. In this system the retrieval unit is capable of connection both in parallel and in series with the foregoing data transmission line. The logic operation circuit of each retrieval unit is made up so as to create and output two kinds of match signals—a match pulse which is taken as the predetermined logical value only when the retrieval key coincides with the corresponding data array and a match latch which is latched to the predetermined logical value on or after the time of their coincidence.

Further, this system is provided with a record symbol detecting circuit to detect whether or not the data read out of the file memory agrees with the predetermined record symbol, a coincidence operation circuit to create and output a coincidence signal according to either of the match pulse and match latch being output from each retrieval unit and a latch circuit inserted into the foregoing address transmission line.

This system permits selection of a character retrieval mode and a record retrieval mode, and when the character retrieval mode is selected. The retrieval unit is connected in series with the data transmission line. And the match signal operation circuit creates a match signal that takes a specific logical value when all the match pulses are the predetermined logical values, and the latch circuit gives a prescribed time lag to the address signal. Further, the address memory control circuit outputs a write command in response to a specific logical value of the match signal. On the other hand, when the record retrieval mode is selected, the retrieval unit is connected in parallel with the abovementioned data transmission line. The match operation circuit, by performing a logical operation on the match latch as predetermined according to the logical property of the retrieval key, outputs the abovementioned operation results as the foregoing match signal when the record symbol detecting circuit has detected the coincidence. The latch circuit latches the input address signal when the record symbol detecting circuit has detected the coincidence and further outputs the address signal latched before. Furthermore the address memory control circuit outputs a write command in response to the specific logical value of the match signal.

This invention furthermore offers an editing system that detects and deletes desired information in a file and insert other information into the file instead. This system is equipped with first file memory to store files, a data shift register having a predetermined number of stages to accept and transfer successively the data read out of the first file, a delete item register having a predetermined number of stages to register the delete items, a delete character bit register having bits corresponding to each stage of this delete item register where the registered item registering bit alone is taken as the predetermined logical value, a comparator to compare each data within the delete item register with each data within the corresponding data shift register respectively; a logic operation circuit to create a match pulse that becomes a specific logical value only when the delete item and the corresponding data array within the data shift register coincide with each other through a predetermined logic operation on each comparison result output from the comparator and the delete character bit data within the delete character bit register, a delete character bit shift register which reads and transfers the delete character bit data within the delete character bit register, in response to the specific logical value of the match pulse, an insert item register having a predetermined number of stages to register the insert items, a replacement data shift register having a predetermined number of stages to read and transfer the data within each stage of the insert item register in response to the specific logical value of match pulses, an insertion character bit register having bits corresponding to each stage of the insert item register and to register the insertion character bit data which take only the bit corresponding to the insert item registering stage as the predetermined logical value, an insertion character bit shift register which reads and transfers the insertion character bit data within the insertion character bit resister in response to the specific logical values of match pulses, a gate through which either of the output data of the data shift register and the output data of the replacement shift register are selectively passed, a No. 2 file memory to store the data which passed the gate, and a control signal operation circuit that creates the control signal to control, through a specific logical operation on the delete character bit shift register data and the insertion character bit data, the readout timing of the No. 1 memory, the shift timing of the data shift register and delete character bit register, the shift timing of the replacement shift register and insertion character bit register, the write timing and gate selection timing of the No. 2 file memory respectively.

BRIEF DESCRIPTION OF THE DRAWINGS

Referring to an embodiment of this invention concerning the retrieval device.

BEST MODE FOR CARRYING OUT THE INVENTION

Figure 1:
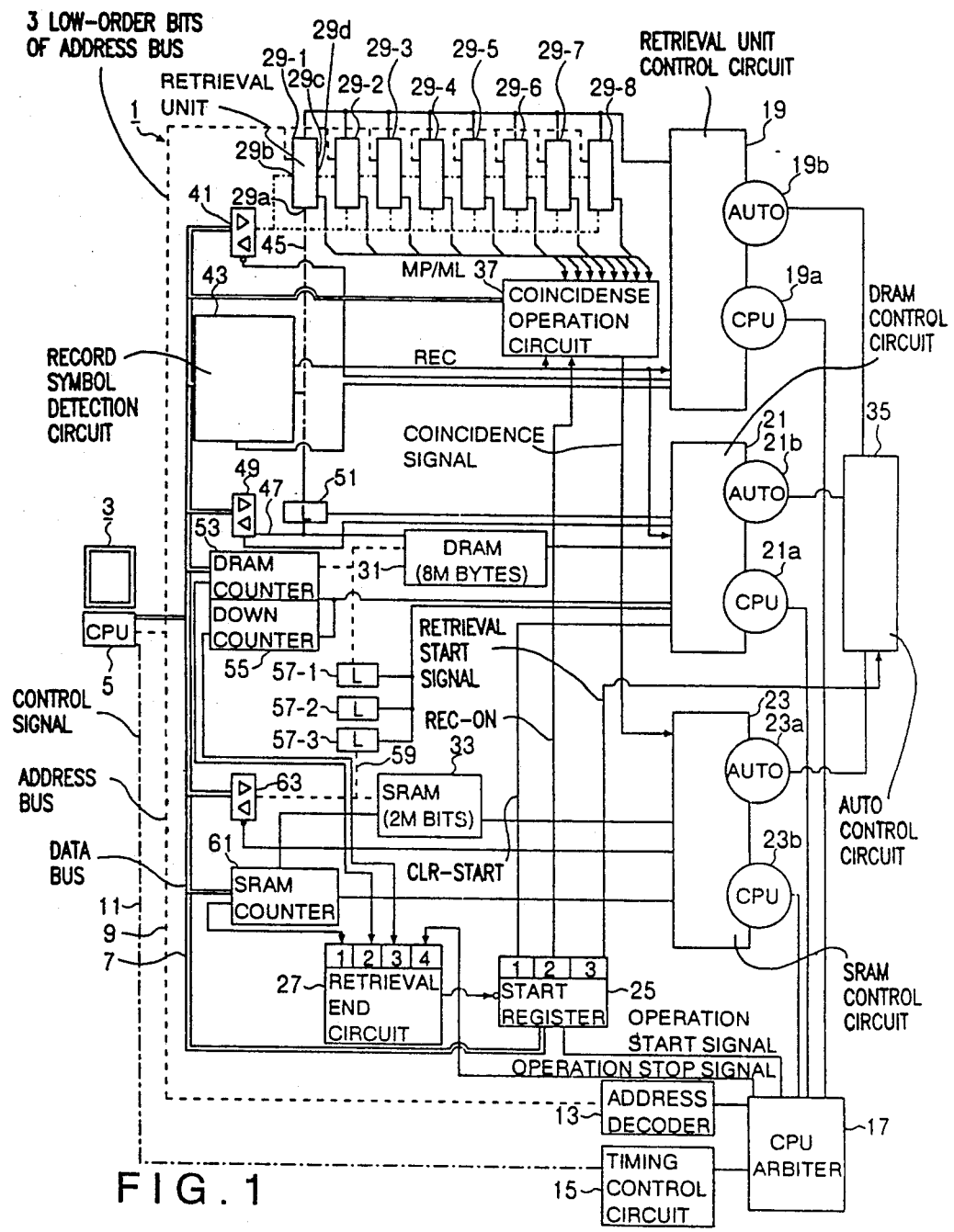
FIG. 1 is a systematic block diagram showing the entire configuration.

Before entering into the description of the embodiment, major terms are defined below. Furthermore the example used in the following description assumes the retrieval of files in Japanese. However, the retrieval of files in other languages will be understood on the analogy of these examples.

The "retrieval mode" means the kind of retrieval, and in this embodiment, there are two kinds: "character retrieval" and "record retrieval".

The "character retrieval" is used for the purpose of picking up specific information (special signs, characters, words, sentences, etc.) from a file and specifying in what part of the file it is written. For example, this is used when it is desired to pick up all the places where the name of the specific person is noted.

The "record retrieval" is used for the purpose of picking up only the record where the specific information is noted by dividing the files into a number of records (blocks) in advance and by checking the presence/absence of specific information for each file. For example, this retrieval is used, for example, when it is desired to pick up the record of a person satisfying the specific conditions (for example, special family names, date of birth, nationality, etc.) from among the files where personal information is classified into records per each person.

The "retrieval item" means the specific information intended for the retrieval. For example, this means the name of the specific person in the foregoing example of character retrieval and the specific conditions in the foregoing record retrieval.

The "retrieval key" means the character or character array used as a clue to find out the retrieval items. In the character retrieval, the retrieval key identical with the retrieval item is used. Namely, for example, if the retrieval item is "山口(Yamaguchi)", that is, the family name of the specific person, the "山 口(Yamaguchi)" is used as a retrieval key.

On the other hand, in the record retrieval, as the retrieval keys, the constituents of the conditions for retrieval items are used. Namely, in the retrieval of a personal record, in cases where the specific conditions for the retrieval items are, for example, the family name "山口(Yamaguchi)" or "山田(Yamada)" with the nationality other than Japan, as the retrieval key are used "name: 山 (Yamaguchi)", "name: 山田 (Yamada)" and "Nationality: Japan".

A "positive key" and a "negation key" mean the kind of retrieval keys in the record retrieval.

The "positive key" is a retrieval key having a positive logical relationship with the retrieval item; and the "negation key is a retrieval key having a negative relationship with the same. Namely, in the above retrieval example of the personal record, the conditions for the retrieval item are expressed by the logical sum of the affirmation of the retrieval key name:山 口(Yamaguchi)" and the affirmation of the retrieval key "name: 山田(Yamada)" and the logical product with the negation of the retrieval key "nationality: 日 本 (Japan)". Consequently, the "name: 山 口 (Yamaguchi)", and "name:山 田 (Yamada)" are positive keys and the "nationality: 日本 (Japan)" a negation key.

A "retrieval preparation step", a "retrieval execution step" and a "result output step" mean each step classified by time of the retrieval operation performed by the apparatus in this embodiment.

The "retrieval preparation step" is a step to perform necessary preparation work before the retrieval execution such as the input into files, designation of retrieval modes and registration of retrieval keys.

The "retrieval execution step" is a step to execute a retrieval operation where retrieval items are retrieved from files.

The "result output step" is a step to output the results of the retrieval.

As appropriate embodiment of this invention will be explained below by referring to drawings.

FIG. 1 is a block diagram showing the total configuration of an embodiment of the information retrieval apparatus relative to this invention.

This apparatus is composed of a basic unit 1 of the retrieval apparatus and a personal computer 3 which is connected to the basic unit and functions as an interface between the basic unit 1 and the operator. The basic unit 1 is composed entirely of hardware, and does not have any part that works depending on software. The CPU 5 of the personal computer 3 and the basic unit 1 are connected by the aid of a data bus 7, address bus 9 and control bus 11.

The basic unit 1 has an address decoder 13 connected to the address bus 9 from the CPU 5, and a timing control circuit 15 connected to the control bus 11. The address signal from the CPU 5 is decoded by the address decoder 13 and the resulting decoded signal is delivered to a CPU arbiter 17. The control signal from the CPU 5 is subjected to a timing adjustment (which, for example, makes the readout/write command signal agree with the readout/write cycle) through the control circuit 15 and then it is given to the CPU arbiter 17. The CPU arbiter 17 supplies the timing-adjusted control signal from the CPU 5 to a retrieval-unit control circuit 19, DRAM control circuit 21, SRAM control circuit 23, start register 25 and retrieval finish circuit 27. At that time, the circuit to which the control signal should be given by the output signal from the address decoder 13 is determined.

The retrieval unit control circuit 19 is a circuit to control the operation of the retrieval unit 29 and its peripheral circuit. The DRAM control circuit 21 is a circuit which controls the operation of the DRAM 31 and its peripheral circuit. The SRAM control circuit 23 is a circuit which controls the operation of the SRAM 33 and its peripheral circuit. These control circuits 19, 21, and 23 have respectively the input terminals 19a, 21a, and 23a to receive control signals from the CPU arbiter 17 and the input terminals 19b, 21b, and 23b to receive control signals from the auto control circuit 35, and these two kinds of input terminals are formed so that, when one a terminal is enabled, the other is automatically disable.

The auto-control circuit 35 is a circuit consisting of a counter to create control signals during retrieval operation and a group of logical value "1" of the logic circuit, which starts the operation upon receiving a retrieval start signal from the start register 25, and stops the operation with the retrieval stop signal "0". The auto-control circuit 35 in operation supplies to the retrieval unit control circuit 19, DRAM control circuit 21 and SRAM control circuit 23 control signals timing-adjusted between each other. During the period when the auto-control circuit 35 is issuing control signals, that is, in the retrieval execution stage, the autoinput terminals 19b, 21b, and 23b are enabled, and therefore each of the control circuit 19, 21, and 23 is placed under the control of the auto control circuit 29 alone, thus making participation of the CPU 5 in the operation of the basic unit 1 practically impossible (however, as described later, by the command from the CPU 5 the operation can be stopped in case of emergency). During the nonoperating time of the auto control circuit 35, that is, solely in the retrieval preparation step and the result output step, the control with the CPU 5 becomes possible because the CPU input terminals 19a, 21a, 23a are enabled.

The start register 25 is a circuit to make the retrieval execution step start up while setting the basic unit 1 to the initial status. At the start of the retrieval execution step, the start register 25, while being supplied with 3-bit start data from the CPU 5 via the data bus 7, receives an operation start signal input from the CPU arbiter 17. The start register 25, upon receipt of the operation start signal, outputs each bit of the start data to the DRAM control circuit 21, coincidence operation circuit 37, and autocontrol circuit 35.

The first bit of the start data is called a clear start signal, CLR-START, and when this is "1", the DRAM control circuit 21 clears the DRAM address counter 39 at the retrieval start time. Further, the second bit is called a record retrieval-ON signal, REC-ON, and when this is "1", the coincidence operation circuit 37 sets the logic of its own circuit to the logic prespecified by the CPU 5. The third bit is called a retrieval start signal—always set to "1" at the retrieval start—and upon receipt of this signal, the autocontrol circuit 35 start operation and controls each of the control circuits 19, 21, and 23. Thus, the retrieval execution step starts. On receipt of a signal from the retrieval finish circuit 27, the start register 25 turns the retrieval starts signal to "0". Thus, the autocontrol circuit 35 ceases operation and the retrieval execution step finishes Furthermore the retrieval finish circuit 27 will be described later.

A plurality (eight in this embodiment) of retrieval units (29-1 to 29-8), a two-way gate 41 to connect/disconnect these retrieval units 29 to and from the data bus 7 and a record signal detecting circuit 43 to detect the partition of records in the record retrieval are placed under the control of the retrieval unit control circuit 19.

The retrieval unit 29 is a circuit to collate the character file with the retrieval key. Each retrieval unit 29 has two data input terminals 29a and 29b one of which only is enabled selectively according to the retrieval mode and a piece of data output terminal 29c. The data input terminal 29a on one side is a terminal enabled in performing a record retrieval and is connected to the data bus 45, and when this is made enable, each retrieval unit 29 assumes a status of parallel connection with the data bus 45. Hereunder, this data input terminal 29a will be called a parallel input terminal. The other data input terminal 29b is a terminal made enable when performing character retrieval, and is connected with the data output terminal 29c of the preceding-step retrieval unit 29 (but, in the case of the first step unit 29-1, it is connected with the data bus 45). When this terminal is enabled, each retrieval unit 29 assumes a status of serial connection with the data bus 45. Hereunder, this terminal 29b will be called a serial input terminal.

In the retrieval preparation step, the retrieval key is registered in the key register (reference No. 292 in FIG. 2) built in the retrieval unit 29. In this embodiment the key register 292 consists of eight stages, and on each stage one character can be registered at a time. In the character retrieval, as aforementiond, eight retrieval units 29 are connected in series, and so in this series of units, one retrieval key with up to a maximum of 8×8=64 characters can be registered.

When the retrieval key is short of 64 characters, registration is made by stowing the characters in the order from the first stage 2S1 (the stage nearest to the data input terminal) of the key register 292 of the initial-step retrieval unit 29-1. In the record retrieval, because eight retrieval units 29 are connected in parallel, retrieval keys of up to a maximum of eight characters can be registered up to a maximum of eight keys. When the number of characters of the retrieval key is short of eight, registration is made by stowing the characters in the order from the first stage 2S1 of the key register 292 within each retrieval unit 29. In the retrieval key registration, the stage of the key register 292 to which each character of the retrieval key is to be registered, is specified by the address signal given to the retrieval unit 29 via the address bus 9 (least significant three bits). Appendant to the retrieval key registration, the mask data for ambiguous retrieval are registered in the 8-bit mask register within the retrieval unit 29 (reference No. 293 in FIG. 2). The mask data are the data to specify unidentified characters in the retrieval key (for example, an unidentified characters "?" when an unidentified personal name " 山口?Yamaguchi?0)" is taken as a retrieval key). Both the retrieval key and the mask data are delivered to the retrieval unit 29 from the CPU 5 via the gate 41 and data bus 45.

In the retrieval execution step, as described later, a character file is read out of the DRAM 3, and the read character data are sent to the data bus 45. In the record retrieval, these character data are input to each retrieval unit 29 from its parallel input terminal 29a at the some time. The retrieval unit 29 has an 8-stage shift register (reference No. 294 in FIG. 2), and the input character data are output from the data output terminal 29c via this shift register 294.

On the other hand, in the character retrieval, the character data are first input to the first-step unit 29-1 from its serial input terminal 29b, output from the terminal 29c via the shift register 294, and then input to the second-step unit 29-2 from its serial input terminal 29a and so on, thus passing through the shift register 294 within respective retrieval units 29-1 to 29-8 successively.

Within each retrieval unit 29, the character data row flowing through the shift register 294 are collated with the retrieval key and the results of collation are output from the match signal output terminal 29d as two kinds of signals, i.e., match pulse $\overline{MP}$ and match latch $\overline{ML}$. Here, the match pulse $\overline{MP}$ is a signal that becomes "0" only when the collation results in coincidence between the character data row and the retrieval key. Further, the match latch $\overline{ML}$ is a signal that becomes "0" when the collation results in the coincidence, and thereafter stays latched to "0" continuously. The match pulse $\overline{MP}$ and the match latch $\overline{ML}$ are afforded to the coincidence operation circuit.

The record symbol detecting circuit 43 is a circuit to detect the record symbol inserted in the partition of each code of character files. In the retrieval preparation step, the record symbol is given from the CPU 5 to the record symbol detecting circuit 43 via the data bus 7. This record symbol is registered in the register (not shown in the diagram) within the record symbol detecting circuit 43. In the retrieval execution step, the record symbol detecting circuit 43 inputs character data from the data bus 45, and collate the data with the record symbol as registered. And the collation result is sent as the record signal REC to the retrieval unit control circuit 19, DRAM control circuit 21 and coincidence operation circuit 37. This record signal REC becomes "1" when the foregoing collation results in the agreement (that is, when the partition of records is detected). This record signal REC of "1" becomes a match latch $\overline{ML}$ clear instruction to the retrieval unit control circuit 19, an operation instruction of the latch 57-3 to the DRAM control circuit 21 and also an coincidence signal output instruction to the coincidence operation circuit 37. Furthermore, in the character retrieval, the record symbol detecting circuit 43 does not work.

On receipt of a match pulse $\overline{MP}$ or match latch $\overline{ML}$ which is output from each retrieval unit 29, the coincidence operation circuit 37 performs the prescribed logic operation on them and outputs the results as a coincidence signal. This coincidence operation circuit 37 is set to such a logic by which the logical product of the match pulses $\overline{MP}$ from each retrieval unit 29 is obtained and which outputs the obtained logical product as a coincidence signal. On the other hand, in the case of the record retrieval, the logical data which shows, in the retrieval preparation step, the logical relationship between the retrieval key and retrieval item (namely, whether each key is an affirmative key or a negative key, and also whether they are to be made a logical product or a logical sum) are input to the coincidence operation circuit 37 form the CPU 5 via the data bus 7.

This logical data are registered in the logic register (reference No. 374 in FIG. 4) within the coincidence operation circuit 37. In the retrieval execution step, the coincidence operation circuit 37 applies, in response to the record-ON signal REC-ON of "1", a logical operation according to the logical data on the match latch $\overline{\text{ML}}$ from the retrieval unit 29 and a logic is set up so that the result of the operation is output as a coincidence signal only when the record signal REC is received. Further in the coincidence signal, coincidence is expressed by "0" and noncoincidence is expressed by "1".

For example, the 8-Mbyte DRAM 31 to store character files, the gate 49 to connect/disconnect the data bus 47 of DRAM 31 to and from the data bus of CPU 5 and the latch 51 to transmit the character data as read out on the data bus 47 from DRAM 31 to the data bus 45 of the retrieval unit 29 are placed under the control of the DRAM control circuit 21. Furthermore the DRAM counter 53 to provide address signals to DRAM 31, the downcounter 55 to access to the DRAM 31 finish with the preset address number and the latch 57 to transmit the address signal being delivered to DRAM 31 in the retrieval execution step to the data bus 59 of the SRAM 33 after time adjustment are placed under the control of the DRAM control circuit 21.

In the retrieval preparation step the character file that becomes the object of retrieval is written to the DRAM 31 from the personal computer 3 via the gate 49. The reason why the DRAM is used as file memory is the availability of a great deal of memory at low cost. Of course, a SRAM suitable for a still higher-speed access may be also used. In the retrieval execution stage, character files are read out from the DRAM 31 by the control from the DRAM control circuit 21. The character data read out of the DRAM 31 are sent to the data bus 45 via the latch 51 and are input into the retrieval unit 29.

The DRAM counter 53 performs a countup operation in the retrieval execution step in synchronism with the write command which is output from the DRAM control circuit 21 to DRAM 31, and gives that count value to the DRAM 31 as an address.

Upon completion of the count up to the last address of DRAM 31, a countout signal is output to the retrieval finish circuit 27, thus completing the retrieval execution step. Further, when it is desired to start retrieval from any given address of the DRAM 31, it is possible to set the address for startup to the DRAM counter 53 from the CPU 5. In such a case because the CPU 5 turns to "0" the first bit of the start data given to the start register 25, the DRAM counter 53 is not cleared at the retrieval start time, thus starting the count from the set address.

The downcounter 55 is used when it is desired to limit the retrieval range within the character file. In such a case, in the retrieval preparation step, the address number within the range desired for retrieval is set to the downcounter 55 from the CPU 5. When the retrieval execution step starts, the downcounter 55 starts countdown from the set address No. in synchronism with the abovementioned write command, an on counting up to 0, it affords the countout signal to the retrieval finish circuit 27, thus completing the retrieval execution step.

The latch 57 is a circuit to output, after time adjustment, the address signal applied to the DRAM 31 to the data bus 59 of SRAM 33, and the time-adjusting mode varies with the retrieval mode. In the character retrieval three latches 57-1 to 57-3 respectively cause a time lag which is equivalent to the readout time of one character data. Therefore, the address signal applied to the DRAM 31 is, after the three character data read out time from that moment, sent out to the data bus 59 and given to the data terminal of SRAM 33. This time delay for three character data coincides roughly with the time required for the process from the moment when the address signal is applied to the DRAM 31 to the moment when the character data are read out of that address, stored in the first stage 4S1 of the shift register 294 of the first-step retrieval unit 29-1, and match pulses $\overline{\text{MP}}$ are output from each retrieval unit 29 on the basis of which a coincidence signal is output from the coincidence operation circuit 37. Consequently, when the coincidence signal "0" indicating the coincidence is output from the coincidence operation circuit 37, the address of the character data stored in the first stage 4S1 of the shift register 294 of the first step retrieval unit 29-1 (that is, the last data of the character data array that coincides with the retrieval item) is applied to the data terminal of the SRAM 33. On the other hand, in the record retrieval, the first and second latches 57-1 and 57-2 respectively cause a time lag for one character. Therefore, the address signal is given a delay of two-character data by the first and second latches 57-1 and 57-2. This delay for two-character data coincides roughly with the time required for the process from the moment when the address signal is applied to the DRAM 31 to the moment when the character data are read out from that address, and input to the record symbol detecting unit 43, and the collation result of this character data with the record symbol is output. The third latch 57-3, which is placed in an operative condition only during the output time of the record signal REC of "1" while latching the address signal output from the latch 57-2, outputs the address signal latched at the last time to the bus 59. Therefore, when the coincidence signal "0" indicating the coincidence is output from the coincidence operation circuit 37, the address of leading record symbol of the record completed at that time (that is, the record coinciding with the retrieval item) is given to the address terminal of the SRAM 33.

For example, the 2M-bit SRAM 33 to store the retrieval result, the gate 63 to connect/disconnect the SRAM 33 data bus 59 to and from the CPU 5 data bus 7 and the SRAM counter 61 to give address signals to the SRAM 33 are placed under the control of the SRAM control circuit 23.

The SRAM control circuit 23, on receipt of a 5 coincidence signal "0" indicating a coincidence from the coincidence operation circuit 37, issues a write command to the SRAM 3. At this time, as aforementioned, the data terminal of SRAM 33 is given, in the character retrieval, the last address of the character data array coinciding with the retrieval item, and in the record retrieval, the leading address of the record coinciding with the retrieval item, and therefore these are written into the SRAM 33 by the foregoing write command. The addresses stored in this SRAM 33 are read out to the CPU 5 at the result output step via a gate 63.

The SRAM counter 61 is cleared and starts a countup simultaneously with the start of the retrieval execution, and gives its count value to the SRAM 33 address terminal. By reading out the count value of the SRAM counter 61 to the CPU 5 after completion of the retrieval, it is possible to confirm the retrieval item in files in the case of the character retrieval, and the number of records satisfying the retrieval item in the case of the record retrieval. If in the midst of the retrieval execution step the SRAM counter 61 completes the count up to the final address, the SRAM counter 61 outputs the countout signal to the retrieval completion circuit 27 and brings the retrieval execution step to a halt. When the retrieval execution step is halted as above, the CPU 5 sets to "0" the first bit of the start bits given to the start register 25 at the time of the next retrieval execution startup.

Thus, since the DRAM counter 53 is not cleared at the time of the next retrieval start, the retrieval execution step restarts at the address following the preceding address.

As aforementioned, on receipt a countout signal from the DRAM counter 53, down-counter 55, or SRAM counter 61, the retrieval completion circuit 27 sends a signal to the start register 25 and brings the step of the retrieval execution to an end. Also, when an operation stop signal is received from the CPU arbiter 17, the retrieval execution step is brought to an end as well. This operation halt signal is output when a retrieval stop command is issued from the CPU 5 to CPU arbiter 17. This is the sole case where the CPU 5 can play a part in the operation of the basic unit 1.

Next, the operations of this embodiment will be described by dividing them into the retrieval preparation step, retrieval execution step and result output step.

A. Retrieval preparation step.

In this step, the operation of the basic unit 1 is controlled by the personal computer 3, and the character file, retrieval key, etc. are set or the basic unit from the personal computer 3 via the data bus 7.

That is, the character file is registered in the DRAM 31, and the retrieval key and mask data are registered in the retrieval unit 29. In the case of the character retrieval, as explained before, the retrieval key is one piece and this is registered by being stowed from the first stage 2S1 of the key register 292 of the first step retrieval unit 29-1. For example, as in the foregoing example, when registering a retrieval key of two characters, say "山 口(Yamaguchi)", the final character "口 (Guchi)" is registered in the abovementioned first stage 2S1, and the leading character "山 (Yama)", is registered in the second stage 2S2. Further, in the record retrieval, a plurality of retrieval keys can be registered, each being registered in different retrieval unit 29. And as already explained, these are registered by being stowed from the first stage 2S1 of the key register 292 of each retrieval unit 29. For example, when registering as in the foregoing example, "Name: 山 口 (Yamaguchi)", "Name: 山 田 (Yamada)", "Nationality: Japan", these are registered respectively in the retrieval unit 29-1, 29-2, and 29-3. In the case of "Name: 山 口 (Yamaguchi)", for example, the final character "口 (Gucchi)" is registered in the first stage 2S1, and the characters ahead "山 (Yama)", ":", "Name", "氏(shi)" are registered successively in 2nd, 3rd, 4th, and 5th stages, i.e., 2S2, 2S3, 2S4, 2S5.

Following this registration of retrieval keys, mask data are registered in the mask register 293 of each retrieval unit 29. In this case, the mask data bit corresponding to the stage without the registration of the retrieval key of the key register 292 is set to the same value as the case of registration of unknown characters. In the case of record retrieval, the logical data are registered in the logic register 374 (refer to FIG. 4) within the coincidence operation circuit 37.

Sometimes, there are cases where the retrieval range in the character file is desired to be limited.

When it is desired to start the retrieval from the midway point of a character file, the retrieval start address is set in the DRAM counter 53. Further, when it is desired to finish the retrieval of a character file midway, the number of addresses from the start address to the end address is set in the down counter 55. In the CPU 5, each bit value of the start data is determined. The first bit is usually set to "1". However, when the retrieval start address has been set in the DRAM counter 53 and when the preceding retrieval execution step has finished midway by the count-out of the SRAM counter 61, the first bit is set to "0", thus preventing the DRAM counter 53 from being cleared at the time of retrieval execution start. The second bit is set to "0" in the case of character retrieval, and to "1" in the case of record retrieval. The 3rd bit is automatically set to "1".

B. Retrieval execution step

The retrieval execution step starts when the retrieval start command is output from the personal computer 3 to the CPU arbiter 17. At this time, the operation start signal is sent from the CPU arbiter 17 to the start register 25, and the start data are delivered from the CPU 5 to the start register 25. The start data are readily output from the start register 25, and the first bit, viz. clear start signal CLR-START is given to the DRAM control circuit 21; the second bit, viz. record-ON signal REC-ON, to the coincidence operation circuit 37; and the 3rd bit, viz. the retrieval start signal, to the auto control circuit 35. From the auto control circuit 35 which has received a retrieval start signal, control signals are sent to the control circuits 19, 21, and 23 of respective parts; and in the control circuits 19, 21, and 23, from the CPU input terminals 19a, 21a, and 23a of respective parts, the enable terminals are switched over to the auto-input terminals 19b, 21b, and 23b, and thereafter, under the control of the auto-control circuit 35, the retrieval execution step is proceeded with. In the retrieval execution step, character files are read out from the DRAM 31 to the data bus 47 under the control of the DRAM control circuit 21. The read character data are sent to the data bus 45 via the latch 51. Hereunder, a description will be given for each retrieval mode.

a. Character retrieval

The character data on the data bus 45 pass through the serially connected shift registers of the retrieval units 29-1 to 29-8 successively, and after being collated with the retrieval key in that process, the collation results are output from each of the retrieval units 29-1 to 29-8.

In the above example, the retrieval key "山口 (Yamaguchi)" is registered in the second and first stages of key registers of the first-step retrieval unit 29-1. In the retrieval units from the second step on, i.e., 29-2 to 29-8, retrieval keys are not registered; however, they are set in the same status as the case of the registration of the all unknown character retrieval key by means of the master data. Consequently, in the first-stage retrieval unit 29-1, only when the character data array "山 口 (Yamaguchi)" is stored in the second and first stages, 2S2 and 2S1 of the shift register 294, the match pulse MP becomes "0". In the retrieval units from the second step on, i.e., 29-2 to 29-8, regardless of the character data array in the shift register 294, the match pulse $\overline{MP}$ is always set to "0". That is, only when the character arrays of the second and first stages 2S2, and 2S1 of the shift register 294 of the first step retrieval unit 29-1 become "山口(Yamaguchi)" the match pulse $\overline{MP}$ from the whole retrieval units 29-1 to 29-8 becomes "0" all at once.

In the coincidence operation circuit 37, the logical product of all match pulses $\overline{MP}$ is calculated. Therefore, when all match pulses $\overline{MP}$ become "0" all at once, a coincidence signal "0" to indicate the coincidence is output from the coincidence operation circuit 37. This coincidence signal "0" is delivered to the SRAM control circuit 23, and a write command is issued to the SRAM 33. At this time, to the data terminal of the SRAM 3, as already explained, the address of the last character "口 (Guchi)" of the retrieval item "山口 (Yamaguchi)" within the DRAM 31 is already made available, and this is written in the SRAM 33.

In this way the retrieval items existing in the character file "山口(Yamaguchi)" is discovered successively, and on every such occasion, the address of the last character "口 (Guchi)" is written into the SRAM 33.

And, when the readout to the final address of the DRAM 31 is finished, or when the read out of the address number preset in the down counter 55 is finished, or when the SRAM 33 becomes full, or when a halt command is issued from the CPU 5, the retrieval execution step comes to the end.

b. Record retrieval

The character data on the data bus 45 are input to respective retrieval units 29-1 to 29-8 which are connected in parallel at the same time, and in the process of passing through the shift register within each unit 29, the data are checked on respective retrieval keys. The results are output from each unit 29.

In the case of the foregoing example, a positive key "Name; 山口 (Yamaguchi)" is registered in the first step retrieval unit 29-1, a positive key "name: 山田 (Yamada)" in the second step retrieval unit 29-2, and a negative key "nationality:日本(Japan)" in the third step retrieval unit 29-3.

Furthermore, in the retrieval units 29-4 to 29-8 on and after the fourth step the retrieval keys, although not registered, are set with the master data in the same status as the case where the retrieval key with all unknown characters is registered. Consequently, when a certain record is read out, the match latch $\overline{ML}$ in each of the retrieval units 29-1 to 29-3 at the first to the third step, is turned at the moment when the character data array matching each retrieval key is stored in the shift register 294. On the other hand, the match latch $\overline{ML}$ in each of the retrieval units 29-4 to 29-8 at the fourth and subsequent steps is set to "0", at the moment of readout start.

The coincidence operation circuit 37 calculates the logical sum of the match latch $\overline{ML}$ from the first-step retrieval unit 29-1 and the match latch $\overline{ML}$ from the second retrieval unit 29-2, followed by the calculation of the logical product of this logical sum and the negation of the match latch $\overline{ML}$ from the third retrieval unit 29-3, and outputs the foregoing logical product as a coincidence signal when the record signal REC is output as "1". Therefore, only when, at the finish time of a certain record, the match latch $\overline{ML}$ from the first step retrieval unit 29-1 or the second step retrieval unit 29-2 is "0", and moreover, the match latch $\overline{ML}$ from the third step retrieval unit 29-3 is set to "1" (that is, in that second, the "name:山口(Yamaguchi)" or "name:山田 (Yamada)" is present and moreover, the "Nationality: 日本 (Japan)" is absent), a coincidence signal "0" indicating the coincidence is output at the finish time of that second.

When the coincidence signal "0" is output, the SRAM control circuit 23 issues a write command to the SRAM 33. At that time, as explained already, to the SRAM-33 data terminal the leading address of that record is given, and this address is written in the SRAM 33. In such a way, the records which agree with the retrieval items are discovered one after the other, and on each such occasion, the leading address of that record is written in the SRAM 33.

Thus, the retrieval execution step is completed under the same conditions as in the case of the character retrieval.

C. Result output step

The operation halt of the auto-control circuit 35 by means of the retrieval start signal "0" completes the retrieval execution step. When the auto-control circuit 35 stops, the control circuits 19, 21, and 23 switches the enable terminal from the auto-input terminals 19b, 21b, and 26b to the CPU input terminals 19a, 21a, and 23a, and the CPU 5 regains its control. In this status the addresses in the SRAM 33 are read out to the CPU 5, and in a proper display mode, for example, in the character retrieval, the character file is displayed on the CRT with the part of retrieval item alone inverse-video displayed, or in the record retrieval, the extracted records are output successively to an external device such as a CRT display. Also, when necessary, the count values of the SRAM counter 61 are also read out and displayed. Next, the retrieval unit 29 and coincidence operation circuit 37 that play a control role in the above-mentioned retrieval execution step will be detailed.

Figure 2:
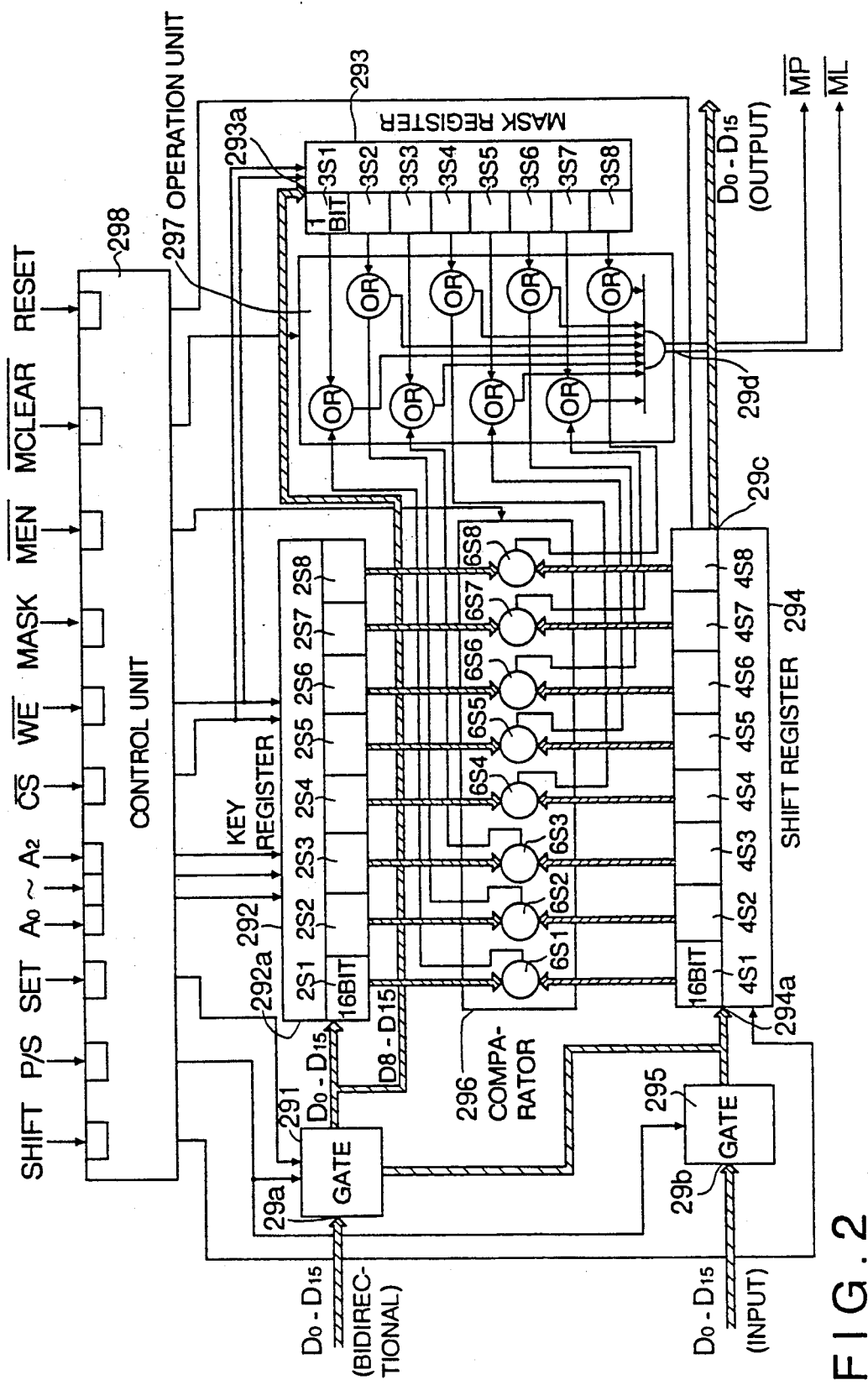
FIG. 2 is a block diagram showing the configuration of the retrieval unit in the embodiment in FIG. 1.

FIG. 2 shows the internal configuration of the retrieval unit 29.

The parallel input terminal 29a is made, via the input-/output gate 291, to permit a selective connection with the key register 292, mask register 293 and data terminals 292a, 293a, and 294a of shift register 294. Furthermore, the serial input terminal 29b is connected, via the input gate 295, to the data input terminal 294a of the shift register 294. When a chinese character is included in the character data to be handled, one character data is composed of 16 bits. Therefore, 16-bit buses are used for connection between the input/output gate 291 and key register 292, between the input/output gate 291 and shift register 294, and between the input gate 295 and shift register 294, respectively. On the other hand, since the mask data is composed of 8 bits, the mask register 293 is connected to the low-order 8 bit line of the bus between the input/output gate 291 and key register 292. The data output terminal of the shift register 294 becomes the data output terminal 29c of the retrieval unit 29.

The character data within each of the stages 2S1 to 2S8 in the key register 292 and the corresponding character data within each of the stages 4S1 to 4S8 are respectively compared with each other at the eight stages 6S1 to 6S9 of the comparator 296, and the comparison result signals to show the their agreement or disagreement are arranged for output against the operation unit 297. The operation unit 297 calculates the logical product of the eight comparison result signals from the comparator 296 and the corresponding mask data bits, and next by calculating the logical sum of these eight logical produces, outputs them as match pulses $\overline{MP}$. Furthermore the operation unit 297 latches the "0" of the match pulse $\overline{MP}$, and outputs this pulse as a match latch $\overline{ML}$. These input/output gate 291, key register 292, mask register 293, shift register 294, input gate 295, comparator 296 and operation unit 297 are placed under the control of the CPU 5 and retrieval-unit control circuit 19 via the control unit 298. The control unit 298 are given various control signals and address signals from the CPU 5 and retrieval unit control circuit 19 as shown in the diagram. Hereunder, by a joint use of the time charts of these signals as shown in FIGS. 3 A–G, the operation of the retrieval unit 29 is explained below:

A. Registering retrieval keys.

Figure 3A:
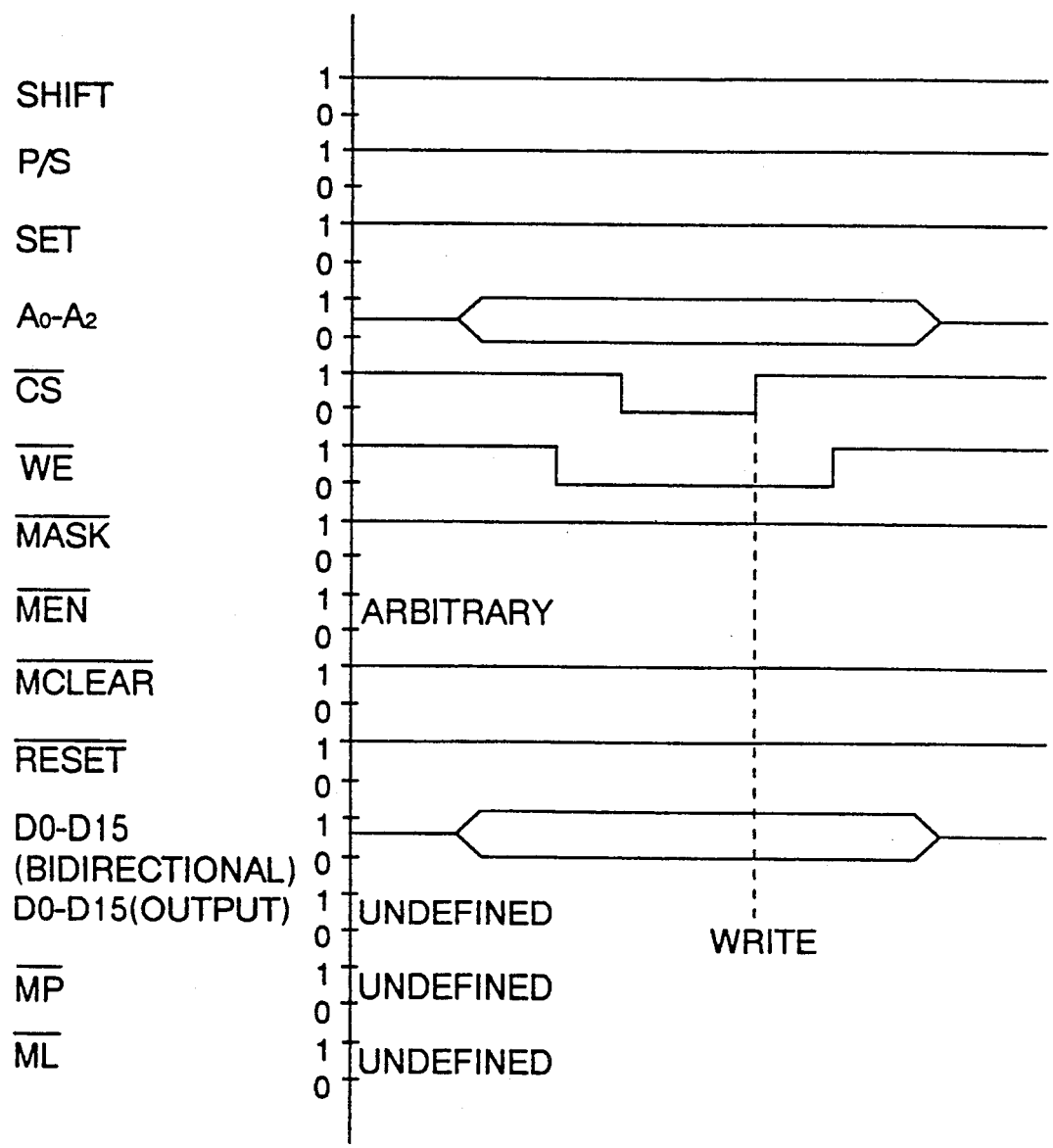
FIGS. 3A-G are the time charts to illustrate the operation of the retrieval unit.

FIG. 3A shows the time chart at the time of this registration with the parallel/serial (P/S) signal at "1", the input/output gate 291 is made enable, and this input-/output gate 291 connects, by the SET signal at "1", the parallel input terminal 29a to the key register 292 and master register 293. Moreover, the mask ($\overline{MASK}$) signal at "1" makes the key register 292 accessible, and further, the mask register 293 unaccessible. This is the basic status for accessing the key register 292.

In this basic status, while, one stage of the key register 292 is specified by the address (A0–A2) signals from the CPU 5, the character data D0–D15 constituting one character of the retrieval key are applied to the key register data terminal 292 from the CPU 5. In this status at the up-edge of the chip select ($\overline{CS}$) signal in the write enable ($\overline{WE}$) signal "0" position, the character D0–D15 are written in the specified stages of the key register 292.

Such operations are carried out on each of stages 2S1–2S8 of the key register 292, thereby the retrieval key consisting of a maximum of eight characters is registered in the key register 292.

B. Verifying retrieval keys

Figure 3B:
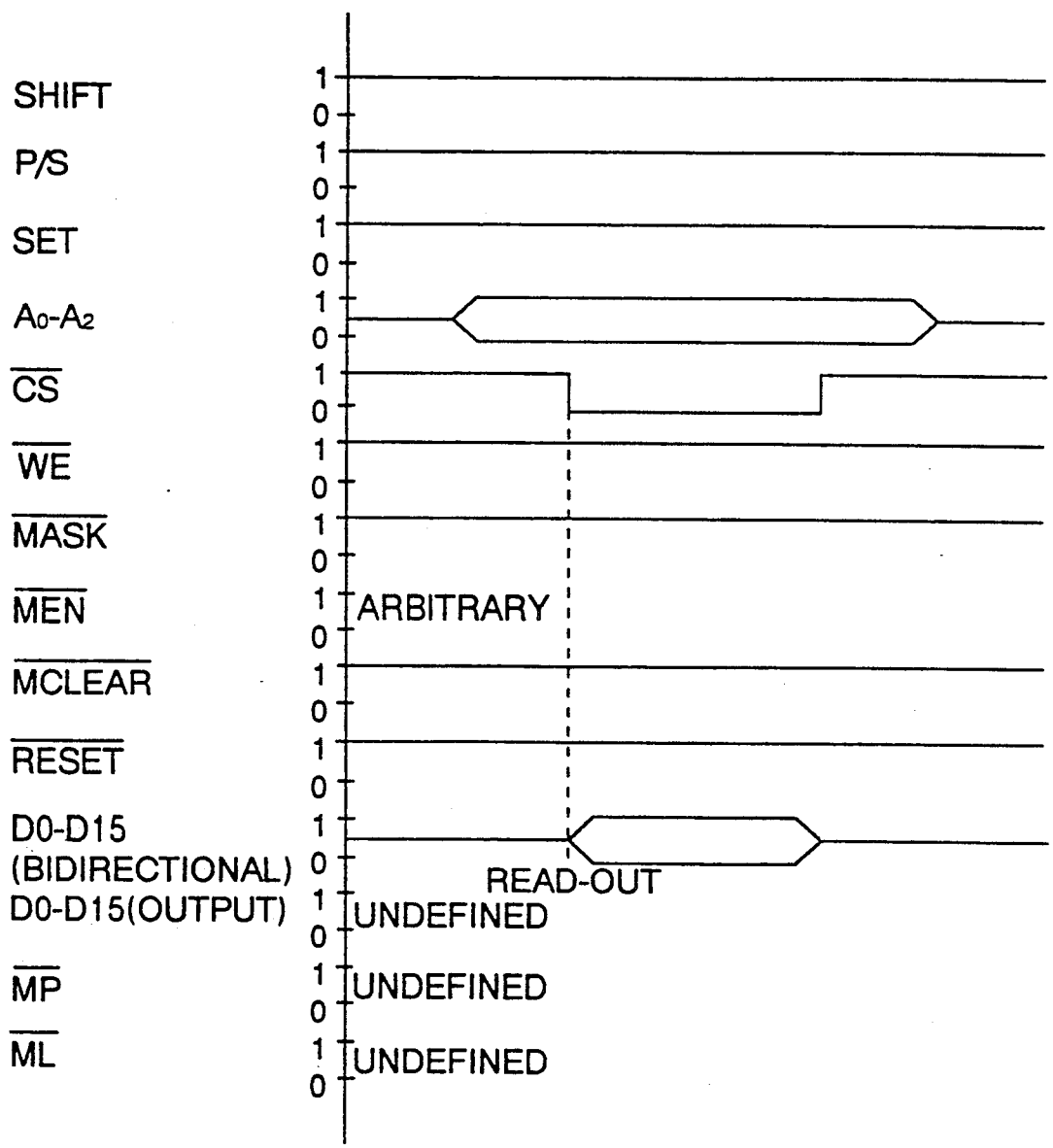

The retrieval keys registered in the key register 292 can be read out and verified. FIG. 3B shows the time chart at that time.

In the same basic status as the retrieval key registering time, a piece of stage is specified by the A0–A2 signals. If in this status, the $\overline{WE}$ signal is turned "1" and further the $\overline{CS}$ signal is turned "0", the character data D0–D15 are read out from the specified stage, and output from the parallel input terminal 29a via the input-/output gate 291.

Such a operation is carried out on stage 2S1–2S8, and the retrieval keys within the key register 292 are read out to the CPU 5.

C. Registering mask data

Figure 3C:
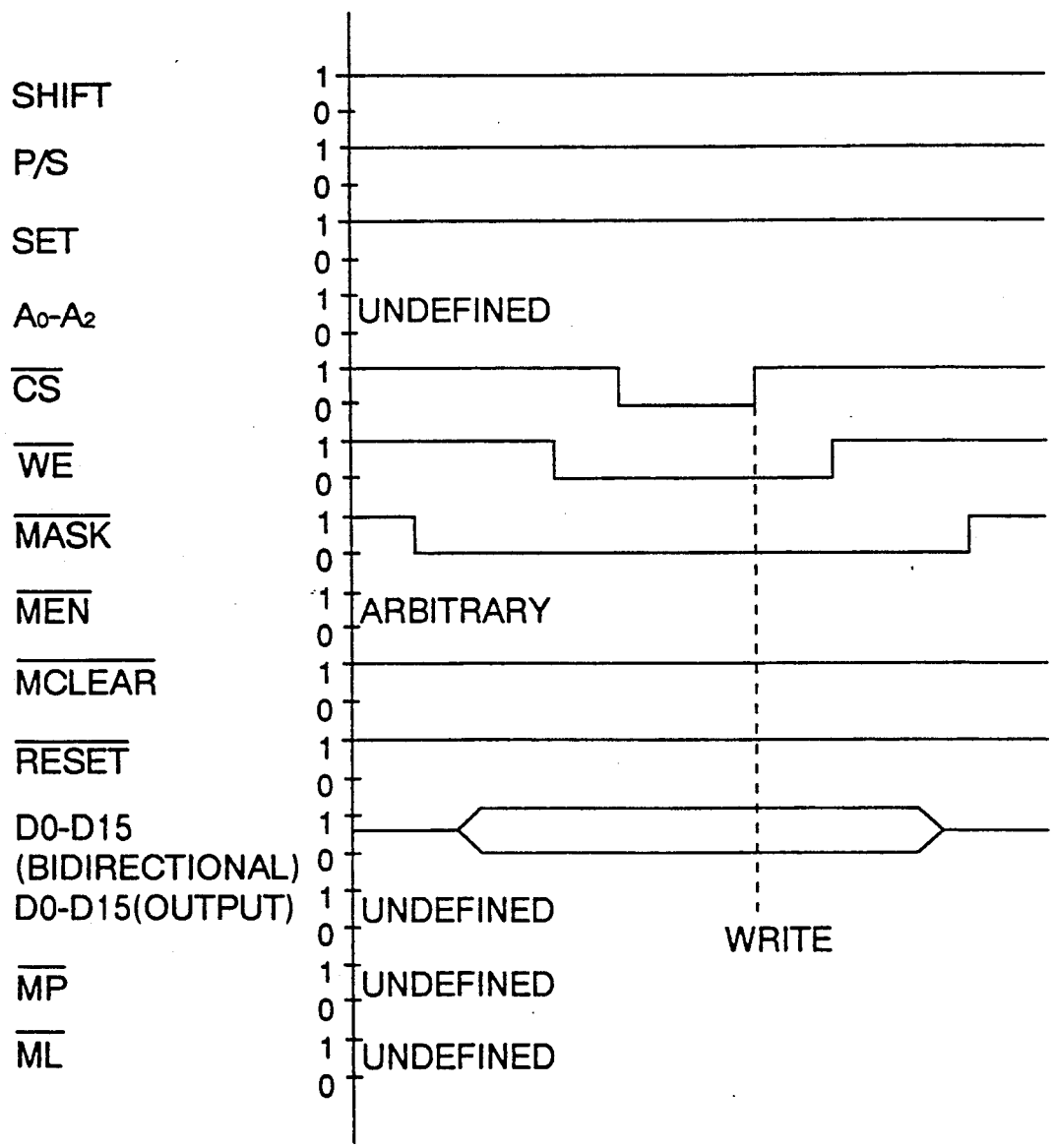

FIG. 3C shows the time chart at this time. The P/S signal and SET signal are set to "1" as in the case of registering and verifying the retrieval key. Further, the $\overline{MASK}$ signal "0" makes the mask register 293 accessible and the key register 292 unaccessible. This is the basic status of the mask register 293.

If this basic status, the mask data from the CPU 5, i.e., D8–D15, are applied to the data terminal 293a of the mask register 293. In this condition the master data DS–D15 are written into the mask register 293 at the up-edge of the $\overline{CS}$ signal in the $\overline{WE}$ signal "0" position.

In respective bits D8–D15 of the mask data, the bit matching the known character in the retrievable key is set to "1", and the bit matching the unknown character is set to "0". Further, as already described, the bit matching the stage not registered in the retrieval key is set to "0". As in the case of an unknown character.

D. Verifying mask data

Figure 3D:
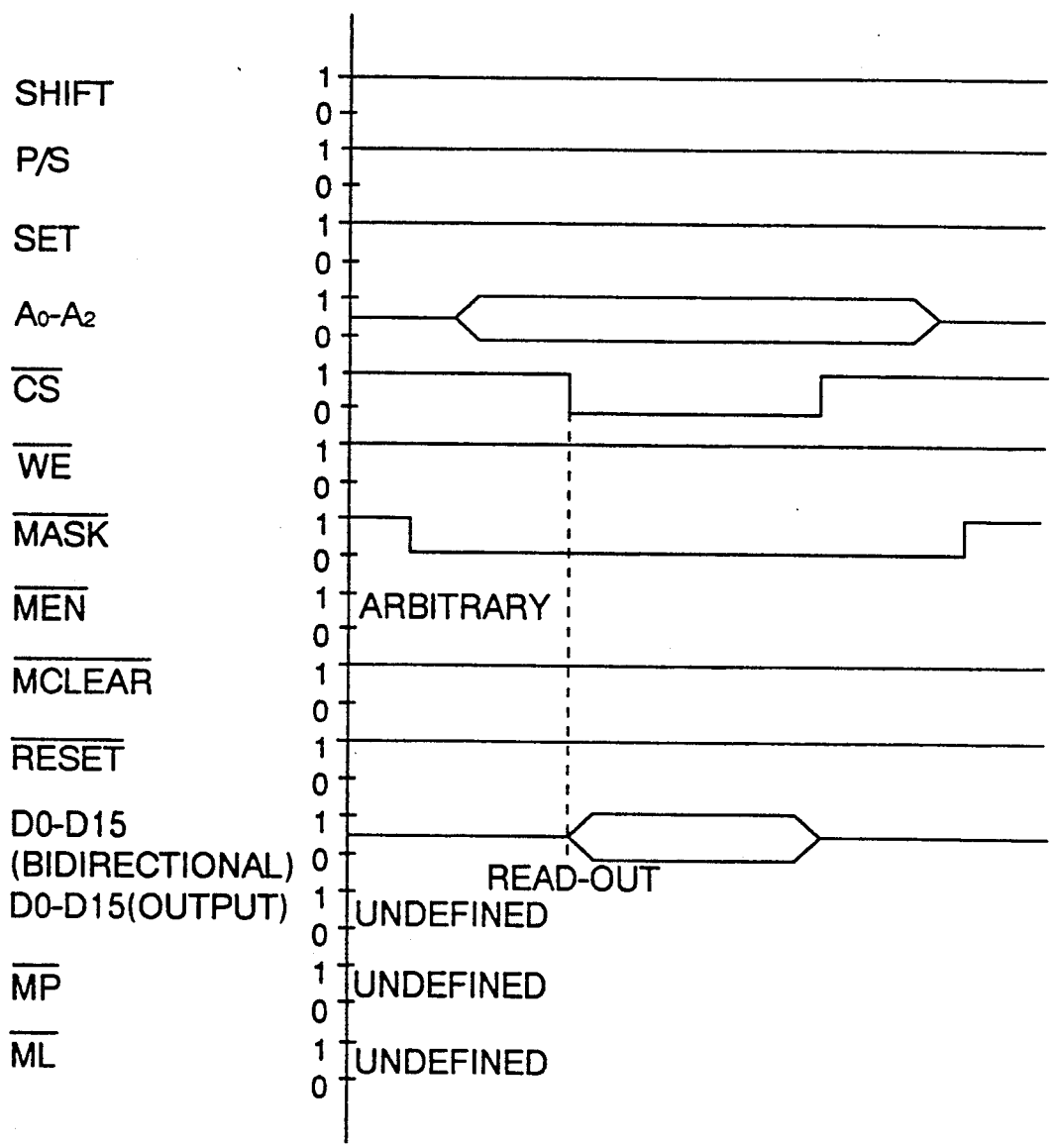

The registered mask data can also be read out for verification. FIG. 3D shows a time chart at that time.

If in the same basic status as the case of verification the $\overline{WE}$ signal is set to "1", and also the $\overline{CS}$ signal to "0", the master data are read out and output from the parallel input terminal 29a.

E. Clearing shift register and resetting match pulse $\overline{MP}$

Figure 3E:
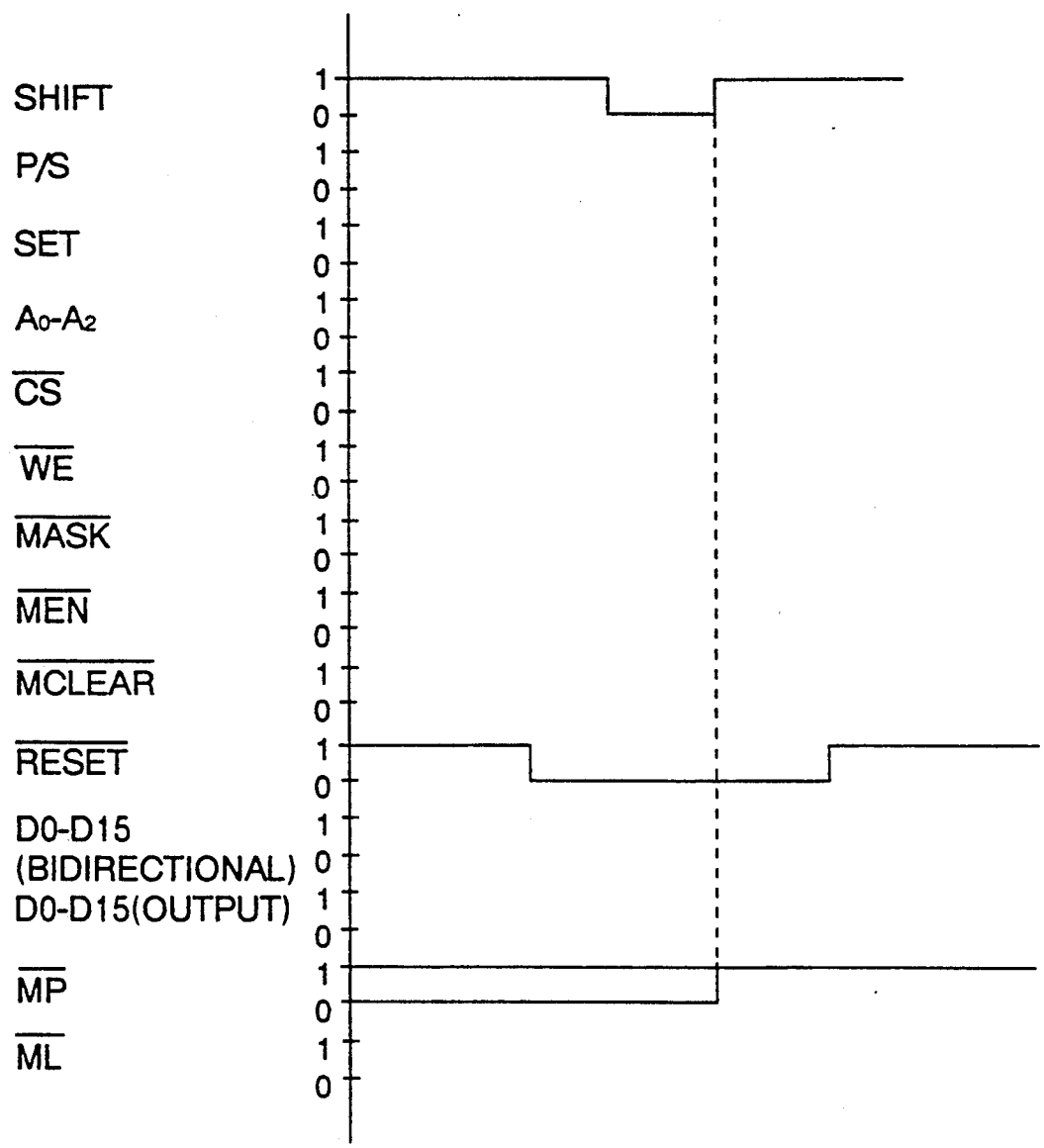

After completing the register of the retrieval key and master data and before the start of the retrieval execution step, the clearing of the shift register 294 is conducted. At this time, as shown in FIG. 3E, the reset ($\overline{RESET}$) signal is turned to "0", and in this condition the shift (SHIFT) signal is raised from "0" to "1", and at its up-edge the character data within all the stages 4S1–4S8 of the shift register 294 are erased. As a result, in the retrieval unit 29 where the retrieval key is registered, the retrieval key comes to mismatch with the character data array, and as shown in the diagram, therefore, match pulse $\overline{MP}$ is reset to "1". At this time, however, in the retrieval unit 29 where the retrieval key is not registered, $\overline{MP}$ is immediately restored to "0" because the mask data are all "0", the match pulse.

F. Match latch $\overline{ML}$ reset

Figure 3F:
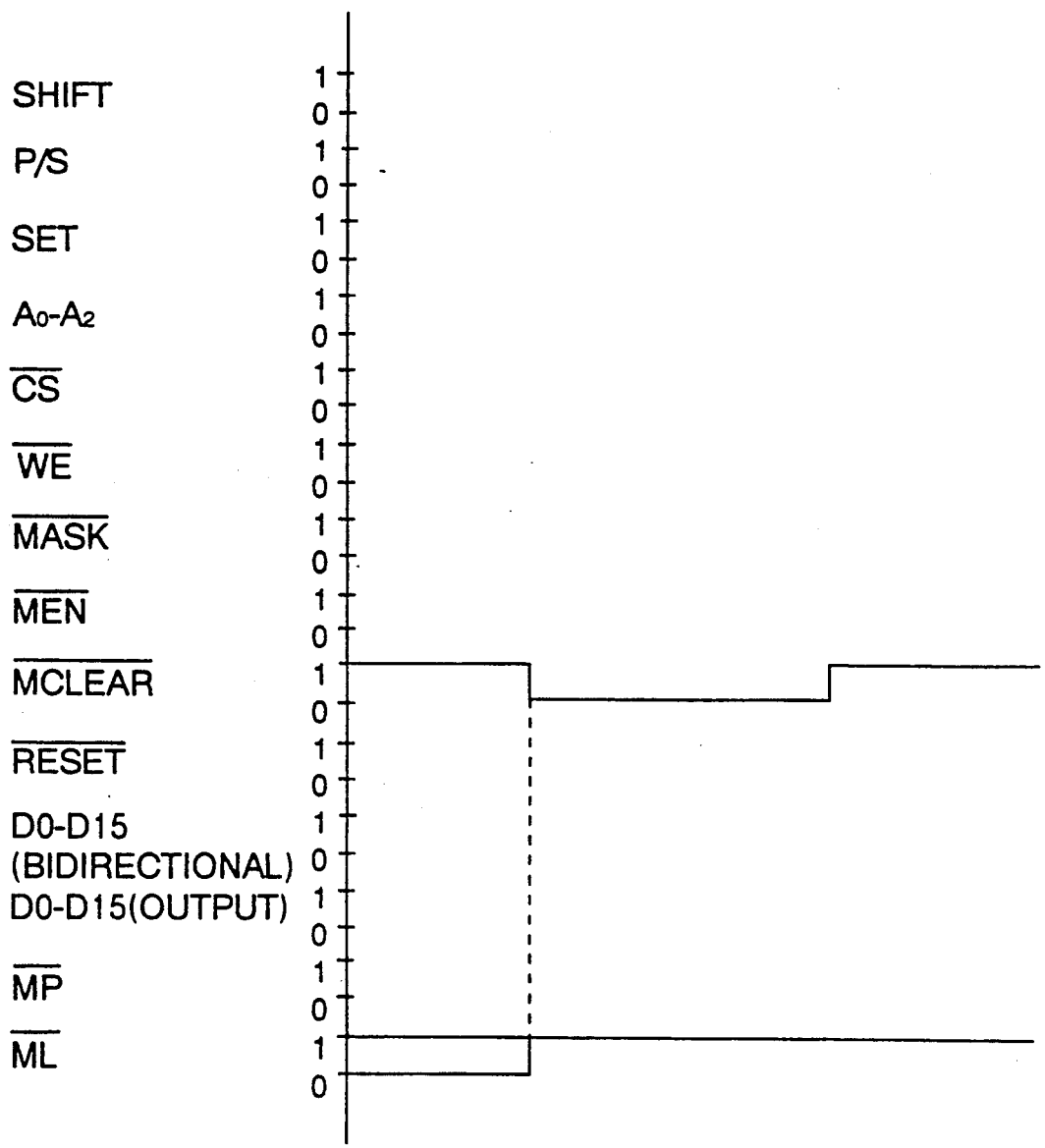

Before starting the retrieval execution step, the match latch $\overline{ML}$ reset is also conducted. At this time, as shown in FIG. 3F, the match clear ($\overline{MCLEAR}$) signal is turned to "0", thereby the match latch $\overline{ML}$ is reset to "1".

Further on the record retrieval the match latch $\overline{ML}$ reset is carried out even at the output time of the record signal REC, i.e., at partition of records.

G. Retrieval execution step

After completion of the operations A to F, the retrieval execution step starts.

Figure 3G:
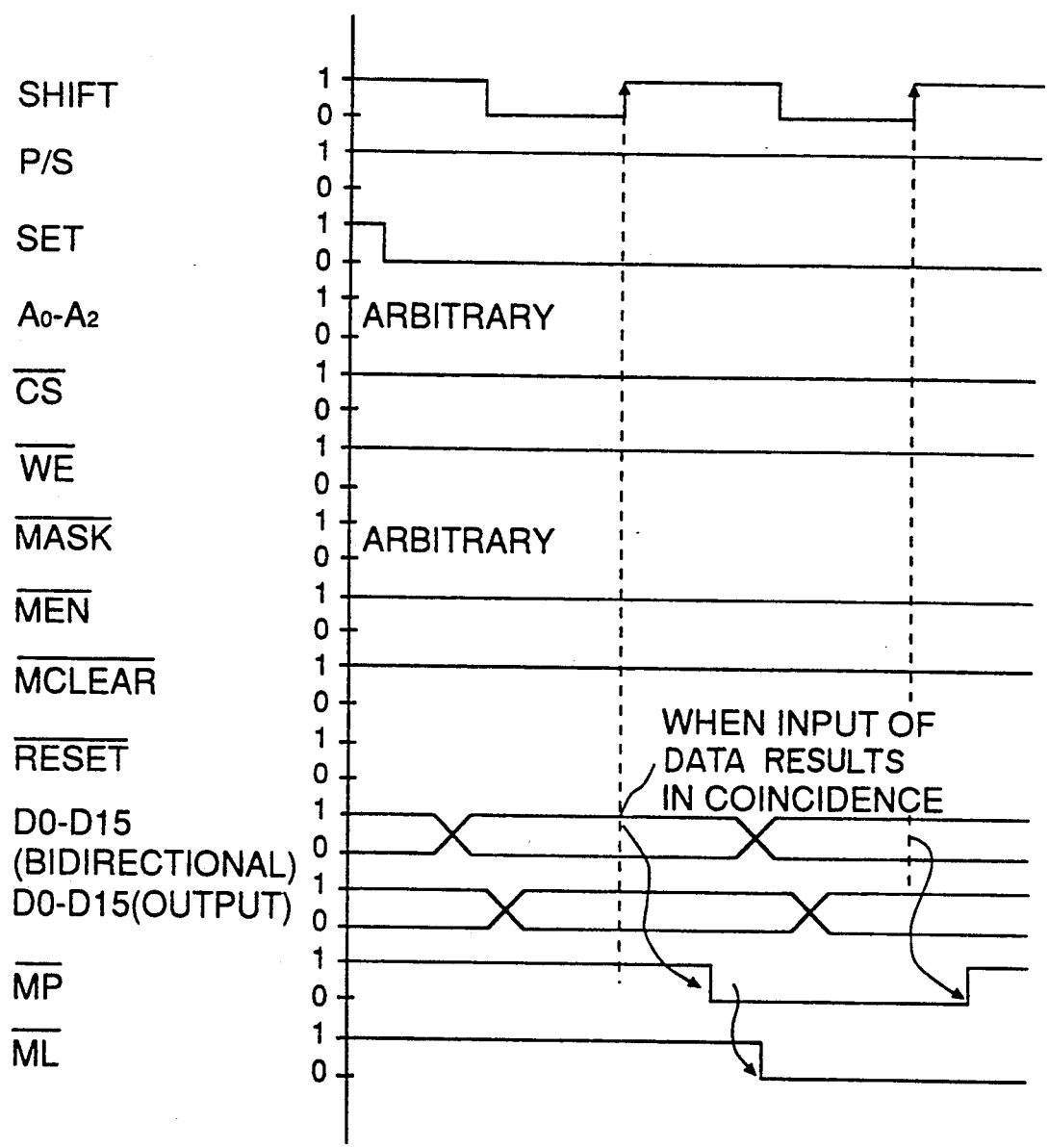

FIG. 3G shows the time chart of the retrieval execution step in the character retrieval. In the case of the character retrieval, as shown in FIG. 3G, the input/output gate 291 is turned to enable by the P/S signal "1", and the parallel input terminal 29a is connected to the shift register 294 by the SET signal "0". On the other hand, in the case of the record retrieval although not shown in the figure, the input gate 295 is made enable, and the series input terminal 29b is connected to the shift register 294 by the P/S signal "0". Therefore, the character data D0–D15 read out from the DRAM 31 are applied to the data input terminal 294a of the shift register 294, via the input/output gate 291 in the case of character retrieval, and via the input gate 295 in the case of record retrieval.

Further more, the shift (SHIFT) signal is repeating "0" and "1" in the same period as the input period of the character data D0–D15. And by the up-edge of this SHIFT signal, the character data applied to the data input terminal 294a are accepted into the No. 1 stage 4S1 of the shift register 294. The character data accepted into the first stage 4S1 are successively transferred to the later stages at subsequent respective up-edges as aforementioned, and are output to the external device of the unit from the data output terminal 29c at last.

Each of the stages 6S1–6S8 in the comparator 29b compares each character data in the shift register 294 with each character data in the key register 292. From the stage where the results have matched, the "0" signal is output, and from the stage of mismatch, the "1" signal is output. The comparison result signal from each of the stages 6S1–6S8 are input into the operation unit 297, and are subjected to an operation for logical product with the corresponding bits of mask data. In the mask data, as already described, solely the bit corresponding to the known characters in the retrieval key is "1", with the other bits being set to "0". Therefore, when the comparison result signal "0" is obtained on all of the known characters in the retrieval key at the least, eight logical products in the operation unit 297 become all "0", and the match pulse $\overline{MP}$ that represent their logical seem becomes "0". In response to this result, the match latch $\overline{ML}$ becomes also "0" and is kept in "0" until reset later.

Figure 4:
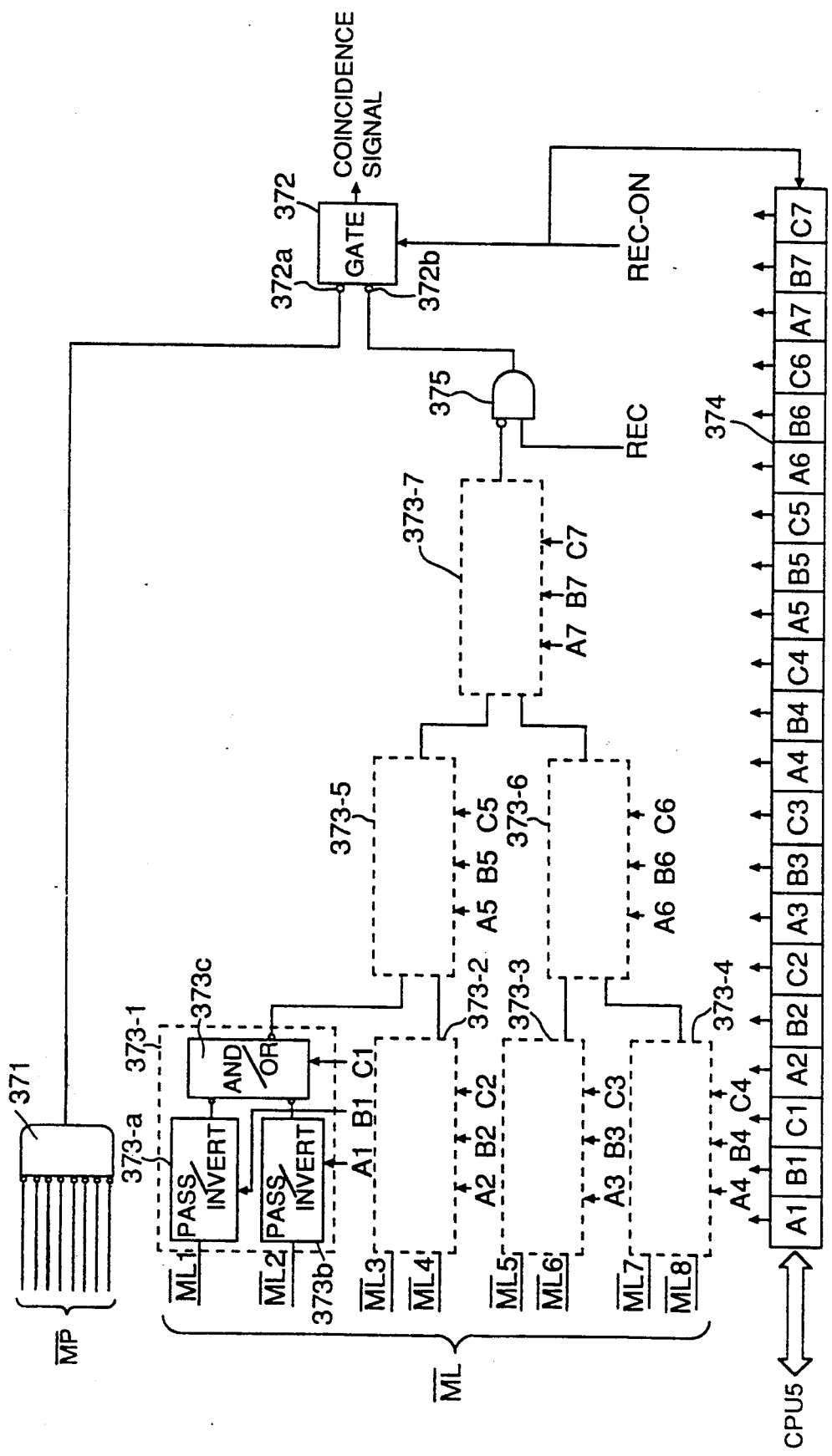
FIG. 4 is a block diagram showing the configuration of the coincidence operation circuit in the embodiment in FIG. 1.

Next, referring to FIG. 4, the matching operation circuit 37 is described in detail.

This coincidence operation circuit 37 is equipped with a negative logical AND circuit 371 which received eight match pulses $\overline{MP}$ from the retrieval units 29-1 to 29-8, and its output is given to the input 372$a$ terminal on one side of the two-input selective gate 372. The selective gate 372 sends out, when the record on signal-REC-ON signal-is "0" (viz. at the execution time of character retrieval), the inverted signal of the output signal of the negative logical AND circuit 371 as a coincidence signal.

Furthermore, the coincidence operation circuit 7 has seven two-input basic operation circuits 373-1 to 373-7. Each basic operation circuit 373 has a pass/input gate 373$a$ which passes or inverts an input signal on one side, a pass/invert gate 373$b$ which passes or inverts the input signal on the other and an AND/OR gate 373$c$ which receives the output signals of these two pass/invert gates 373$a$ and 373$b$ and performs thereon a logical product or logical sum operation. The output signal of this AND/OR gate 373$c$ becomes the output signal of the basic operation circuit 373.

The selection of the contents of operations in each of the gates 373A, 373$b$, and 373$c$ of respective basic operation circuits 373-1 to 373-7 is determined by the 21-bit logic data A1, B1, C1 . . . , A7, B7, C7 which are given from the logic register 374. As explained already, the logic data A1, B1, C1 . . . , A7, B7, C7 are, in the retrieval preparation step of the record retrieval, registered from the CPU 5 into the logic register 374, and by the record on signal REC-ON "1", in the retrieval execution stage, sent to each of the basic operation circuits 373-1 to 373-7.

The eight match latches $\overline{ML}$ from the retrieval units 29-1 to 29-8 are input into the first step basic operation circuits 373-1 to 373-4. The output of the basic operation circuits 373-1 and 373-2 at the first step becomes the input signals of the second basic operation circuit 373-5. Furthermore, the output signals of the first step basic operation circuit 373-3 and 373-4 become the input signal of the second basic operation circuit 373-6. Furthermore the output signals of the basic operation circuits 373-5 and 373-6 at the second step become the input signals of the basic operation circuit 373-7 at the third step. And output signal of this basic operation circuit 373-7 at the third step becomes the input signal of the AND circuit 374.

The AND circuit 374 takes a logical product of the output signal of the basic operation circuit 373-7 at the third step and the record signal REC showing the partition of records, and gives this to the input terminal 372$b$ on the other side of the selective gate 372. This selective gate 372 outputs the inverted signal of the AND circuit 374 output signal as a coincidence signal when the record-ON signal REC-ON is "1" (i.e. at the record retrieval execution time)

The operation of this coincidence operation circuit 37 is as follows:

A. Character retrieval

In the retrieval execution step the match pulse $\overline{MP}$ from each of the retrieval units 29-1 to 29-8 is invert-input to the AND circuit 371, and its output signal is sent to the output terminal 327$a$ of the selective gate 372. In the selective gate 327, the record on signal REC-ON is "0", and therefore the output signal of the AND circuit 371 is invert-input and output as a coincidence signal. Therefore, when the all match pulses $\overline{MP}$ have turned "0", a coincidence signal to show a coincidence "0" is output.

B. Record retrieval

In the retrieval preparation step, the logic data A1, B1, C1 . . . , A7, B7, C7 are registered from the CPU 5 into the logic register 374. In the retrieval execution step, the logic data A1, B1, C1, . . . A7, B7, C7 are output by the record-ON signal REC-ON "1" to each of the basic operation circuits 373-1 to 373-7.

Thereby, the logic of each of the basic operation circuits 373-1 to 373-7 is determined.

The logic variations that can be set by basic operation circuit 373 are obtained in the number of two raised to third power (8) depending on the way of giving three bits, A, B, and C. Consequently, the logic variations that can be set by seven basic operation circuits 373-1 to 373-7 are obtainable in the number of 8 raised to seventh power. From among these variations, a logic according to the logical relationship between the retrieval key and retrieval item is determined by the logic data A1, B1, C1, . . . , A7, B7, C7.

For instance, in the abovementioned record retrieval the logic setting is made as follows. Here it is assumed that the match latches $\overline{ML1}$, $\overline{ML2}$, and $\overline{ML3}$ are the match latches corresponding to "name: 山口 (Yamaguchi)", "name: 山田 (Yamada)", and "nationality: 日本 (Japan)", respectively.

In this case, in the first basic operation circuit 373-1, the pass/invert gate 373$a$, and 373$b$ are both set to pass, and the AND/OR gate 373$c$ is set to OR. Therefore, the first, basic operation circuit 373-1 works as a negative logical OR circuit and outputs a signal "0" when either one of the match latches $\overline{ML1}$ or $\overline{ML2}$ is "0". In the second basic operation circuit 373-2, the pass/invert gate 373$a$ of the match latch $\overline{ML3}$ is invertset, the pass/invert gate on the other side 373$b$ is set to pass, and the AND/OR gate is set to AND. Because, as already explained, the match latch $\overline{ML4}$ which does not match the retrieval key is always "0", the second basic operation circuit 373-2 works as an invert circuit of the match latch $\overline{ML3}$, and outputs a signal "0" only when the match latch $\overline{ML3}$ is "1". The 5th basic operation circuit 373-5 is set to a negative logical AND circuit, and when the output signals of the first and second basic operation circuits 373-1, and 373-2 are both "0", viz. when either one of the match latches $\overline{ML1}$ and $\overline{ML2}$ is "0" and the match latch $\overline{ML3}$ is "1", it outputs a signal "0".

The 3rd, 4th and 6th basic operation circuits 373-3, 373-4, and 373-6 are set to a negative logical AND circuit. Since the match latches $\overline{ML3}$-$\overline{ML8}$ are always "0", the output signal of the 6th basic operation circuit 373-6 becomes always "0". The 7th basic operation circuit 373-7 is also set to a negative logical AND circuit. Consequently, the output signal of the 7th basic operation circuit 373-7 becomes equal to the output signal of the 5th basic operation circuit 373-5.

If, when the record signal REC becomes "1" at the record end, the output signal of the 7th basic operation circuit 373-7 is "0", signal "0" indicating a coincidence is output from the selective gate 372, a coincidence. Consequently, the coincidence signal "0" is output when either one of the match latches $\overline{ML1}$ and $\overline{ML2}$ is "0" and the match latch $\overline{ML3}$ is "1", viz. when in the finished record either one of "name: 山口 (Yamaguchi)", and "name: 山田 (Yamada)", exists and moreover, "Nationality: 日本 (Japan)", does not exist.

The operation time by one basic circuit 372 can be suppressed to around ten nanoseconds. Therefore, the operation using the coincidence operation circuit 37 can be completed in around several ten nanoseconds at the most.

Figure 5:
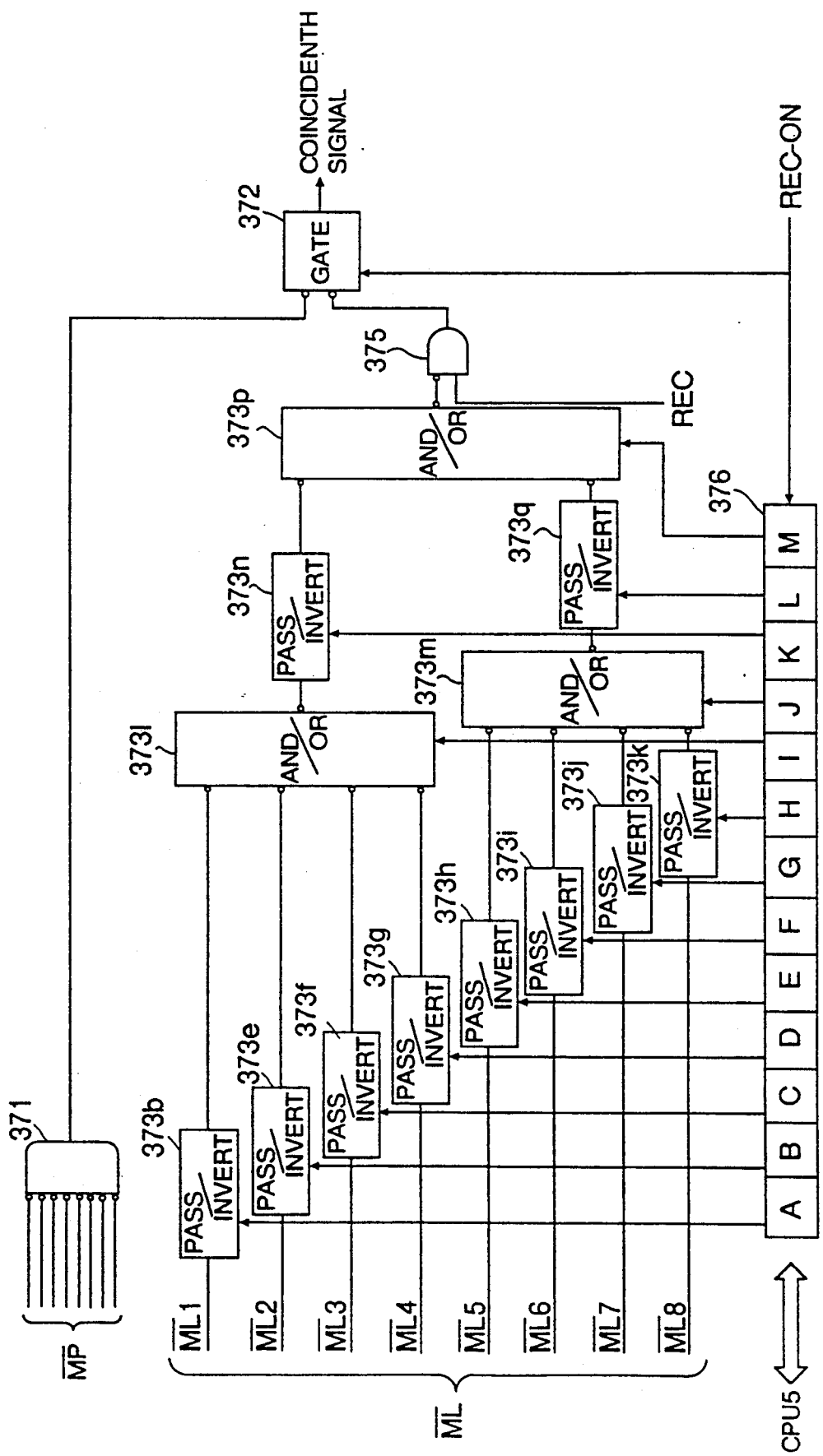
FIG. 5 is a block diagram showing another configuration of the coincidence operation circuit in FIG. 5.

In FIG. 4 the combination of seven basic operation circuits 373 makes, for eight match latches $\overline{ML}$, free setting of logic in the number of 8 raised to 7th power possible. In the actual retrieval, however, since setting too complex logical conditions is very few, and moreover, cases of dividing the conditions into blocks are abound, an abbreviated circuit configuration as shown in FIG. 5 is practicable as well. This circuit in FIG. 5 has eight pass/invert gates 373a–373k each of which receives a match latch $\overline{ML}$, two 4-input AND/OR gates 3731 and 373m which receive these output signals, two pass/invert gates 373n and 373o which receive each of the said output signals and two input AND/OR gates 373p which receive these output signals. The contents of operations of these gates 373A–373p are determined by the 13-bit logic data A, B, ..., M delivered from the logic register 376. Therefore, logic variations in the number of 2 raised to the 13th power are available.

Figure 6:
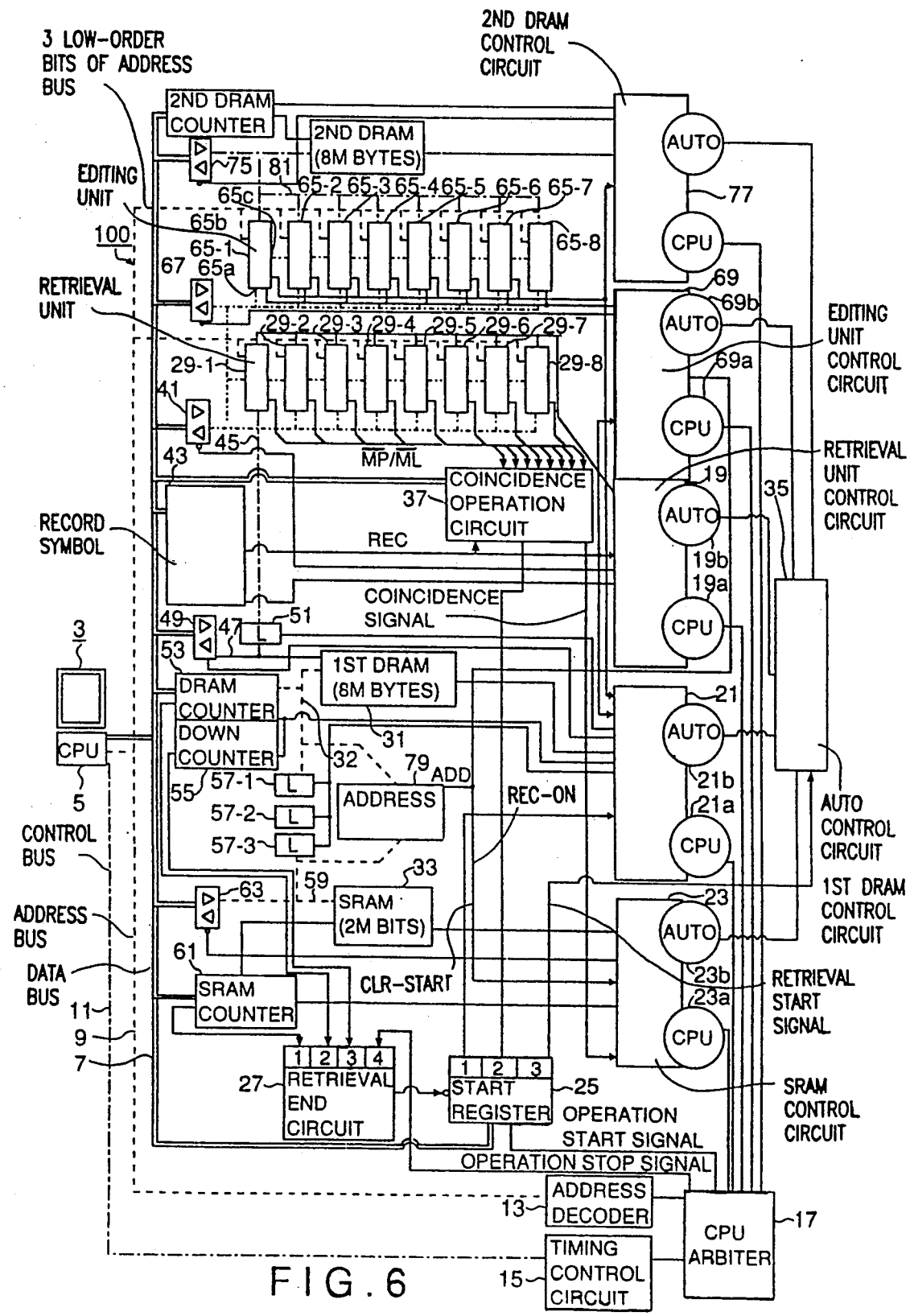
FIG. 6 is a system block diagram showing the total configuration of another embodiment of this invention.

FIG. 6 shows an embodiment of the information editing apparatus using the information retrieval system of this invention.

This example is obtained by adding an editing factor to the embodiment of FIG. 1. Before entering into the description of the embodiment, the major terminology will be defined below.

"Editing" means an operation by which a random character array is deleted from a character file and another character array is inserted in its place.

"Editing mode" means a type editing, and in this embodiment, the editing made is selected from two types-"character editing" and "record editing". The "character editing" means an editing mode that searches for a random character array from the whole character file, and replaces it with another character array. For example, this mode is used, for instance, for rewriting a certain personal name into another personal name in a novel.

The "record editing" means an editing mode which picks up a record meeting the predetermined conditions from a file, and carries out the editing of that record alone. For example, from a group of personal records, only the records of the persons whose birthday has arrived are picked up for use in renewing the ages.

"Delete item" means a character array to be deleted by editing from a file.

"Insert item" means a character array to be inserted into a file in place of a delete item by editing.

"Editing preparation step", "Editing execution step", "Results output step" mean steps into which the editing work performed by the apparatus of the embodiment is divided by time.

The "Editing preparation step" means the step that performs the necessary preparation work such as the input of files, specification of the editing mode and registration of delete items and insert items before execution of the editing. In the record editing, the retrieval work which picks up the desired record is also included in this step.

The "Editing execution step" is a step where the delete items are retrieved for replacement with insert items.

The "result output step" is a step to output the edited files.

Hereunder, referring to FIG. 6, this embodiment will be explained. Furthermore, to the same elements as in FIG. 1, the same reference numbers are affixed, and for them, the description of FIG. 1 should be referred to. The elements newly added in this embodiment are described below.

A plurality (eight in this embodiment) of editing units 65-1 to 65-8 to conduct editing on character files read out from the first DRAM 31, and the bidirectional gate 67 to connect/disconnect these editing units 65 to and from the data bus 7 of the CPU 5 are provided, and these are placed under the control of the retrieval-unit control circuit 69. Further, the second DRAM 71 to store the edited character file, the second DRAM counter to give address signals to this DRAM 71 and the DRAM 71 to and from the CPU 5 date bus 7 are provided, and these are placed under the control of the second DRAM control circuit 77.

The editing unit control circuit 69 and second DRAM control circuit 77, like the other control circuits 19, 21, and 23, are equipped with CPU input terminals 69a and 77a which are made enable reciprocally and auto-input terminals 69b and 77b, and these are put under the control of the CPU 5 in the editing preparation step and the result output step, and under the control of the auto-control circuit in the editing execution step.

The editing unit 65 is equipped with a data input terminal 65a and a data output terminal 65b and a data input terminal 65a is connected to the data bus 45 from the first DRAM 31, and the data output terminal 65b, to the data bus 81 of the second DRAM 71. The outline of this editing unit 65 is as follows:

In the editing preparation step, the delete item and insert item are input into the editing unit 65 from the CPU 5 via the gate 67 and data bus 45, which are registered respectively in the delete item register (FIG. 7, reference No. 652) and the insert item register (FIG. 7, reference No. 6511) in the editing unit 65. In this embodiment, these registers 652 and 6511 consist of seven stages, and can register the delete item and the insert item up to a maximum of seven characters. In cases where there are a plurality of delete items and insert items (for instance, substituting a personal name in a novel for another personal name and furthermore, a place name, for another place name), these are registered in the different editing unit 65.

In the editing execution step, the character data read out of the first DRAM 31 are input into the total editing unit 65 via the data bus 45 and are passed on to the data shift register (FIG. 7, reference No. 654) in each editing unit 65. At this time, the character data array in the data shift register is collated with the delete item in the delete item register 652 for retrieval of the delete item. When a delete item is not discovered in whichever editing units 65-1 to 65-8, the character data in the data shift register 654 of each of the editing units 65-1 to 65-8 are output contact to the data bus 81. When a delete item is discovered, for example, in the editing unit 65-1, the insert item in the insert item register 652 in the insert item unit 65-1 is read into the replacement shift register (reference No. 6514 in FIG. 7), for output from the replacement shift register 6514 to the data bus 81. In parallel with the output of this insert item, in each of the editing units 5-1 to 65-8, the character data coinciding with the delete items within the data shift register 654 are discarded.

And, on the completion of the output of the above-mentioned insert items, the output of the character data within the data shift register 654 to the data bus 81 is restarted in each of the editing units 65-1 to 65-8.

When the delete item and insert item differ in the number of characters, it is necessary to shift the character next to the delete item ahead or behind by the number of characters at variance. This operation is executed by means of the controls within the editing unit 65 and the operation unit (reference No. 6518 in FIG. 7). This control and operation unit 6518 controls, in response to the foregoing difference in the character number, the timing of the data shift register 654 and replacement shift register 6514 and also controls the read-out and write timing of the first DRAM 31 and second DRAM 71 by sending shift control signals from the signal output terminal 65c to the first DRAM control circuit 19 and the second DRAM control circuit 77, respectively.

The character data output from the editing unit 65 are written in the second DRAM 71. The character file after the editing as written in the second DRAM is, in the result output step, read out into the CPU 5 via the gate 75 and displayed in a proper form.

Between the address bus 32 of the first DRAM 31 and the data bus 59 of the SRAM 33 an address comparator 79 is positioned to detect the start of the record that does the editing at the time of executing the record editing. To perform the record editing, in the editing preparation step, a record retrieval is made with the retrieval unit 29, and the leading address of the record satisfying the desired conditions is stored in the SRAM 3. And with the start of the edit execution step, the first address in the SRAM 3 is read out into the data bus 59. The address comparator 79 compares the address read out of the SRAM 33 with the address applied to the first DRAM 31, and sends the comparison results to the editing unit control circuit 69 and SRAM control circuit 23 as an address coincidence signal ADD. When the above comparison result comes to a coincidence, viz., when the read-out of the record to be edited begins, the address coincidence signal ADD becomes "1" and on receipt of the signal the editing unit control circuit 69 issues a command to editing unit 69 to start the above-mentioned editing operation, and further the SRAM control circuit 23 commands the SRAM 33 to read out the next address. Thereafter, when the record signal REC of "1" to show the record end is output from the record signal detecting circuit 43, the editing unit control circuit 69 commands each editing unit 65 to halt the editing operation. Each editing unit 65 out of service outputs the input character data intact to the data bus 81 via the data shift register 654. Thereafter the foregoing operation is repeated every time the address coincidence signal ADD becomes "1". Thus, the editing is done solely on the record subjected to record detection.

Figures 7, 8:
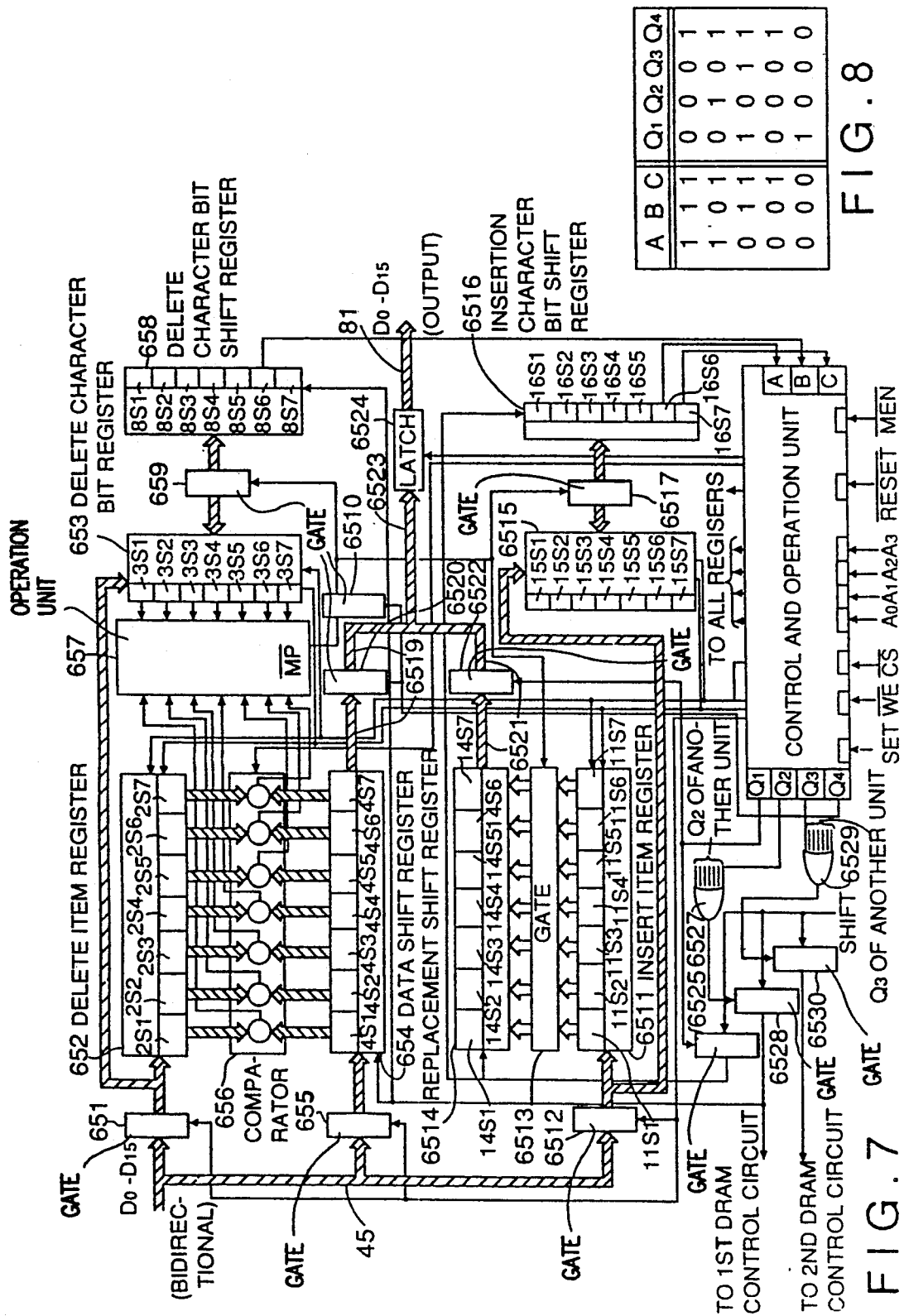
FIG. 7 is a block diagram showing the configuration of the editing unit in the embodiment of FIG. 6.
FIG. 8 is a chart showing the truth table for the shift control performed in the control and operation units within the editing unit.

Next, in reference to FIG. 7, the editing unit 65 will be detailed.

This unit 65 has parts of the same configuration as the retrieval unit 29. Namely, the parts consisting of the gate 651, delete item register 652, deleted-character bit register 653, data shift register 654, gate 655, comparator 656, and operation unit 657. The retrieval operation of the foregoing delete items is performed by these parts. The delete character bit register 653 is a register to register the seven-bit data indicating the stage where the delete item in the delete item register 652 is registered, and these 7-bit data show the stage where the delete item is registered with "1"; and the stage where the delete item is not registered with "0". Further, the delete item registering position in the delete item register 652, unlike the registering position of the retrieval key within the key register 292 in the retrieval unit 29, the delete items are registered in stowed condition on the side of the final stage 2S7. The delete character bit shift register 658 is provided to match the delete character bit register 653, and both registers are connected with each other via the gate 659. This gate 659 is opened by "0" of the match pulse $\overline{MP}$ given from the operation unit 657 via the gate 610, thereby the 7-but data within the delete character bit register 653 are read into the delete character bit shift register 659 in parallel.

The insert item register 6511 is connected to the data bus 45 via the gate 6512. The registration position of the insert item within this register 6511, as in the case of delete item, is registered in stowed condition on the side of the final stage 11S7. Each of the stages 11S1 to 11S7 of this insert item register 6511 are connected to the corresponding stages 14S1 to 14S7 of the replacement shift register 6514 via the gate 6513. The gate 6513, like the above-mentioned gate 659 is opened by "0" of the match pulse $\overline{MP}$, whereby the insert items within the insert item register 6511 are read in parallel with each stage of the replacement shift register 6514.

In the same relationship as the case where the deletion character bit register 653 and the deletion character bit shift register 658 are provided to match the delete item register 652, the insertion character bit register 6515 and the insertion character bit shift register 6516 are provided to match the insert item register 6511. The 7-bit data registered in the insertion character bit register 6515, like the data in the delete character bit register 653, show with "1" the stage where the insert item is registered, and with "0" the stage where it is not registered.

The insertion character bit register 6515 and insertion character bit shift register 6516 are connected via the gate 6517, and this gate 6517, like the gate 659, is opened by the match pulse $\overline{MP}$ "0" which is delivered from the operation unit 657 via the gate 6510. When the gate 6517 is opened, the 7-bit data within the insertion character register 6515 are read in parallel with the insertion character bit shift register 6516.

In the output bus 6519 of the data shift register 654 the gate 6520 is inserted. Furthermore, in the output bus 6521 of the replacement shift register 6511 the gate 6522 is inserted. And these output buses 6519, and 6521 are mutually connected to the output side of the gates 6520, and 6521 to form a common bus 6524, and this common bus 6524 is connected to the data bus 81 via the timing adjusting latch 6524.

The control and operation unit 6518 is equipped with a function to distribute various control signals from the editing unit control circuit 69 and address signals from the CPU 5 to each part in the editing unit 65 and a function to conduct a shift control according to the difference in character number between the above-mentioned delete item and insert item. This control and operation unit 6518 receives set (SET) signals, write enable ($\overline{WE}$) signals, chip select ($\overline{CS}$) signals, reset ($\overline{RESET}$) signals and match enable ($\overline{MEN}$) signals from the editing unit control circuit 69, and address (A0-A3) signals from the CPU 5. The SET signal is a signal to specify whether the input character data D0-D15 are to be sent to the data shift register 654 or to be registered to another register, which is delivered to the gates 651, 655 and 6512 to open/close them. The $\overline{WE}$ signal and $\overline{CS}$ signal are signals to make the register perform the write/read-out operation, being given to all the registers for data registration 652, 653, 6511, and 6515. The signals A0-A3 is signals to specify the stage of the register write data are written/read out, being given to all registers 652, 653, 6511, and 6515 used for data registration. In this case, through a conversion into decimal numbers, address 0 specifies the delete character bit register 653; addresses 1-7 each of the stages 2S1-2S7 of the delete item register 652, address 8 the insertion character bit register 6515, and addresses 9-15 each of the stages 11S1-11S7 of the insert item register 6511. The $\overline{RESET}$ signal is a signal to clear the data in the register, and is given to all registers. With the $\overline{RESET}$ signal is a "0" status, raising the SHIFT signal from "0" to "1" clears the contents of all the registers. The $\overline{MEN}$ signal is a signal to enable the comparator 656.

To conduct the foregoing shift control, the control and operation unit 6518, in response to the input signals A, B, and C, incorporates a logic circuit that forms the output signals $Q_1$, $Q_2$, $Q_3$, and $Q_4$, according to the truck table shown in FIG. 8. Here, arrangement is made so that signal A is given from the 6th stage 16S6 of the insertion-character bit shift register 6516, signal B from the 6th stage 8S6 of the delete character bit shift register 658, and signal C from the 7th stage 16S7 of the insertion-character bit shift register 6516, respectively. The output signal $Q_1$ is applied to the gate 6525 which is used to impart the shift (SHIFT) signal to the replacement shift register 6514 and insertion character shift register 6516. This output signal $Q_1$ is also applied to the gate 6522. Since the gates 6525 and 6522 open when the output signal is $Q_1$ "0", the replacement shift register 6514 and insert character shift register 6516 perform the shift operation, and the character data output from the replacement shift register 6514 are sent out to the data bus 81. The output signal $Q_2$ is input to the OR circuit 6527 together with the output signal $Q_2$ from the other editing unit 65, and their logical sum signal is applied to the gate 6528. Consequently, the gate 6528 opens when the output signal $Q_2$ of the total editing unit 65 is "0". When the gate 6528 is open, the SHIFT signal is sent to the first DRAM control circuit 21 as a shift control signals, and also imparted to the data shift register 654 and the deletion character bit shift register 658. Accordingly the first DRAM 31 performs a readout operation in synchronism with the SHIFT signal, and the data shift register 654 and delete character bit shift register 654 perform a shift operation. The output signal $Q_3$ is input, along with the output signal $Q_3$ from other editing unit 65, into the OR circuit 6529, and their logical sum signal is applied to 6530. Therefore, when the output signal $Q_3$ from the total editing unit 65 is "0", the gate 6530 opens, thus sending the SHIFT signal to the second DRAM Control circuit 77 as a shift signal. Thereby, in synchronism with the SHIFT signal, the second DRAM 71 performs a write operation. The output signal $Q_4$ is applied to the gates 6510 and 6520. Because the gates 6510 and 6520 open when the output signal $Q_2$ is "0", while the match pulse $\overline{MP}$ is applied to the gates 659, 6513 and 6517, the character data output from the data shift register 654 are sent out to the data bus 81. Next, by use of the time chart of FIG. 9 the operation of the editing unit 65 is described below.

A. Registration of delete items, insert items, etc.

Figure 9A:
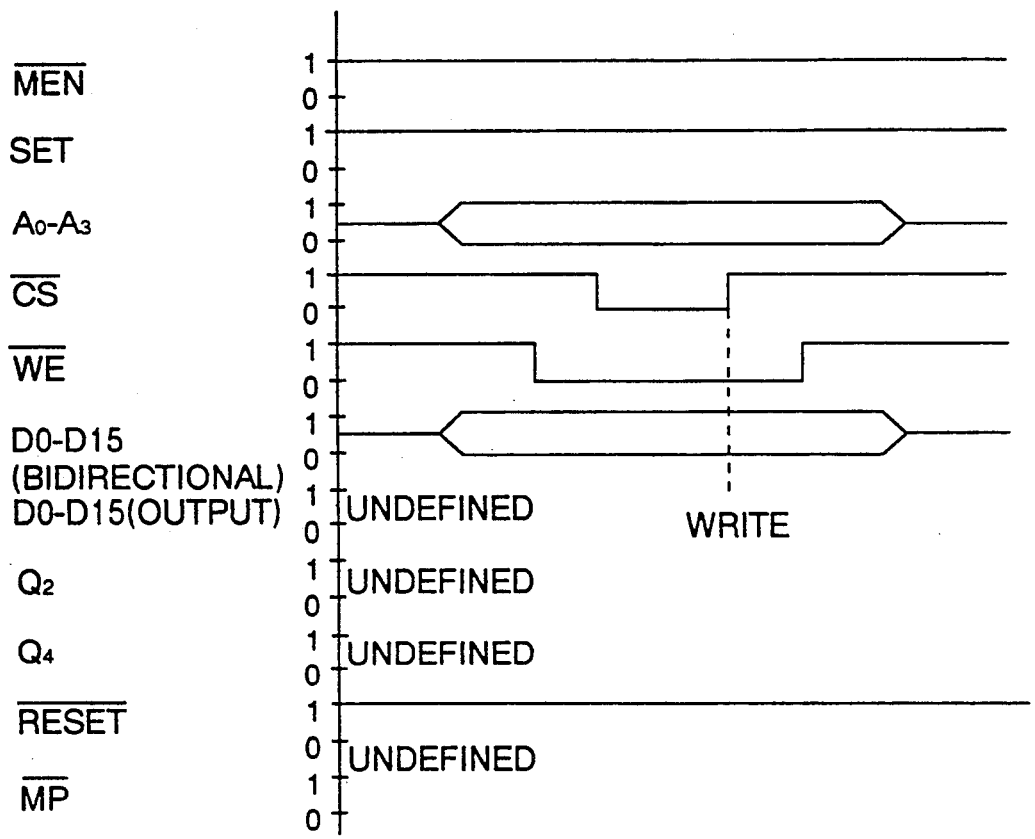
FIGS. 9A-C are the time charts to illustrate the operation of the editing unit.

This is done in the editing preparation step. FIG. 9A shows the time chart at their time, With the SET signal is "1" the gates 651 and 6512 are opened, and character data D0-D15 are delivered from the CPU 5. By the signals A0-A3 the stage of register for registering are specified, and by the rising edge of the $\overline{CS}$ signal at the $\overline{WE}$ signal "0", the character data D0-D15 are written into the specified stage. This operation is repeated on each stage of the delete item register 652 and insert item register 6511, thereby registering the detect items and insert items. In the case of registering into the delete character bit register 653 and insert character bit register 6515, seven-bit data are written into these registers via the low-order seven-bit line of the data bus.

B. Verifying delete items, insert items etc.

The registered delete items, insert items, etc. can be read out and verified.

Figure 9B:
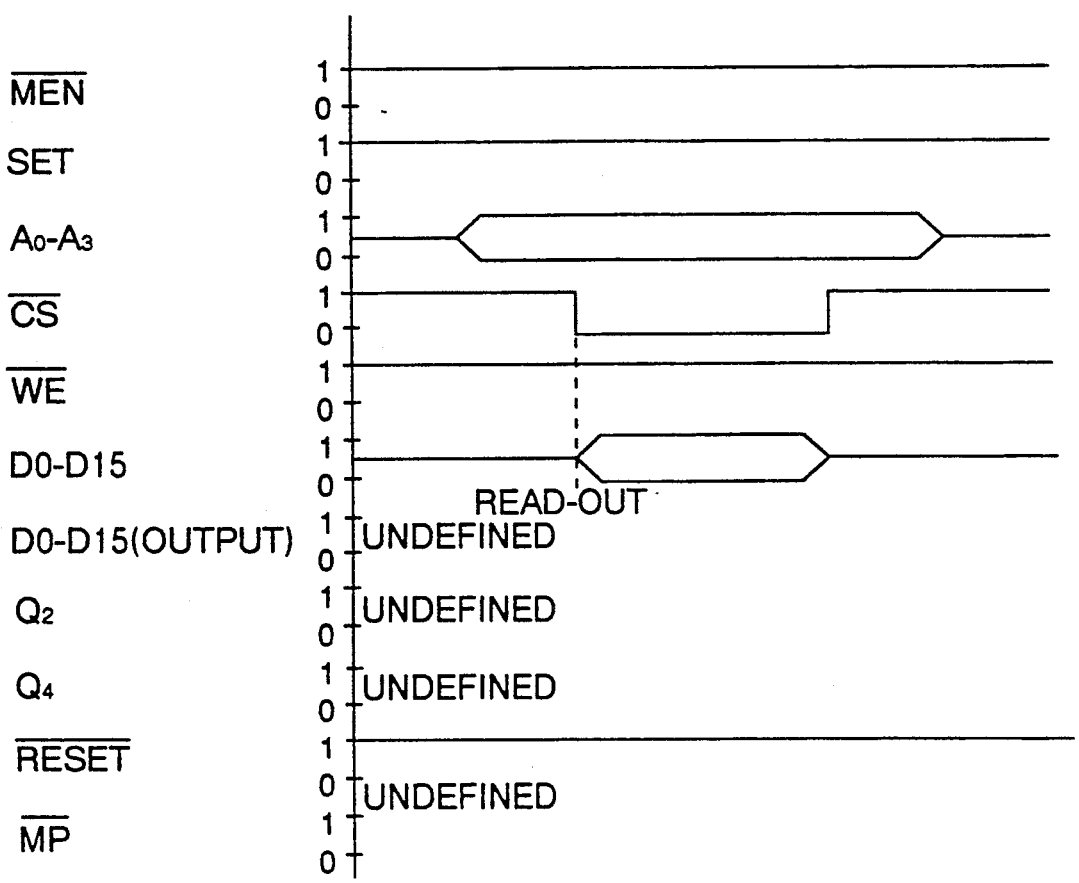

Referring to FIG. 9B with the SET signal in the status "1", the register stages where the read-out is performed are specified by the signals A0-A3 and, while the $\overline{CS}$ signal for the $\overline{WE}$ signal "1" is being "0", the character data D0-D15 are output from the specified stage onto the data bus 45.

C. Edit execution step

Figure 9C:
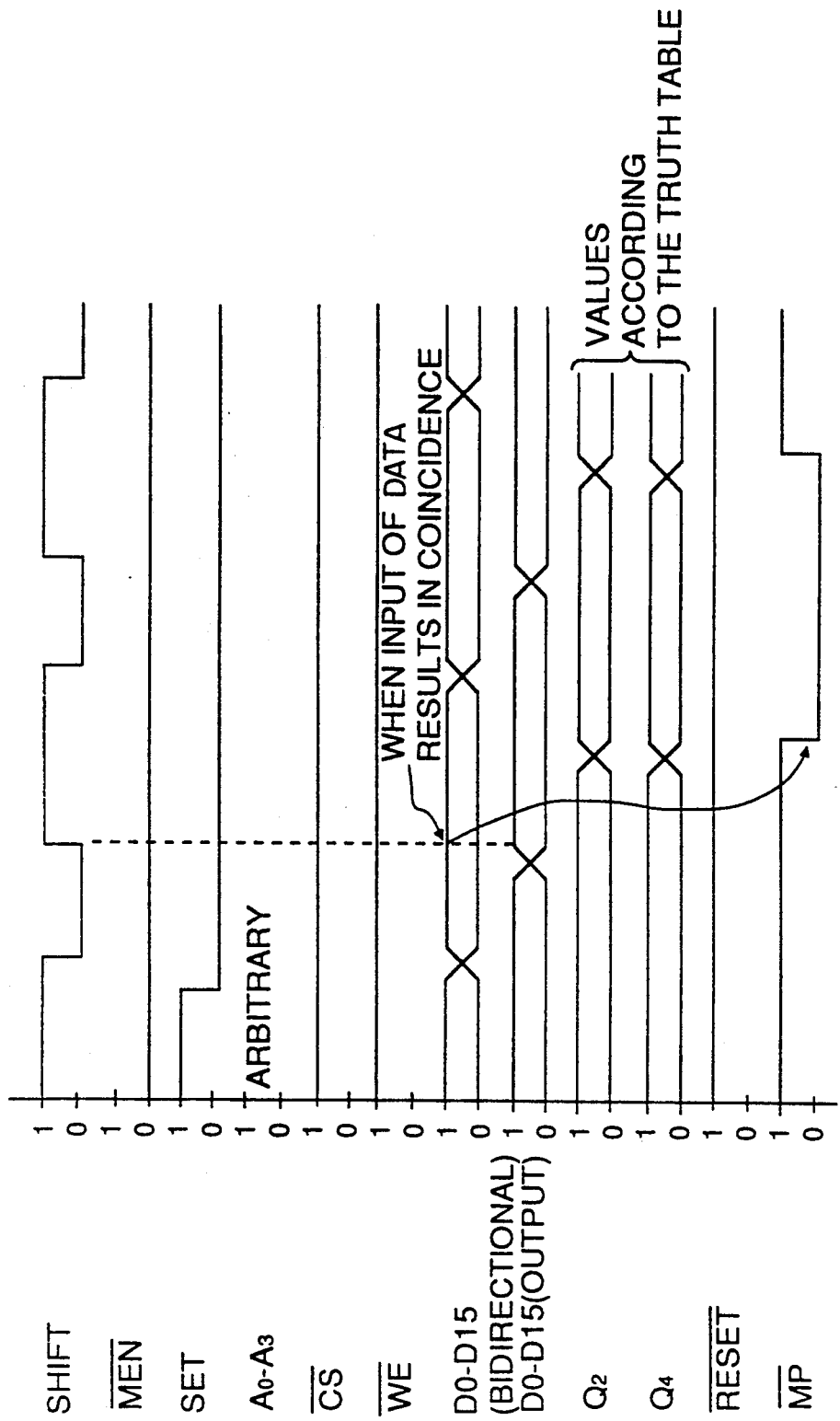

FIG. 9C shows the time chart at this time.

With the SET signal "0" the gate 655 is opened, with the SHIFT signal repeating "0" and "1" cyclically. In synchronism with the repetition character data D0-D15 are read out of the DRAM 31 and applied to the data shift register 654 via the gate 655. At the beginning, because the delete character bit register 658 and the insertion character bit register 6516 are in a clear status, the input signals A, B, and C of the control and operation unit 6518 are all "0", thus in reference to FIG. 8 the output signals $Q_2$, $Q_3$, and $Q_4$ being "0". Consequently, the data shift register 654 receives shift signals, and also in synchronism with this signal reception, accepts the character data D0-D15, and shifts the accepted character data to the later stages. Furthermore, since the gate 6520 is open, the character data D0-D15 delivered from the data shift register 654 are output to the data bus 81 via the gate 6520, and written into the second DRAM 71.

In parallel with the above-mentioned operations, in the comparator 656, the character data array in the data shift register 654 are collated with the delete items in the delete item register 652. When the both items coincide, the match pulse $\overline{MP}$ from the operation unit 657 becomes "0". This match pulse $\overline{MP}$ at "0" is applied, via the gate 6519 which is in an open status by the signal $Q_4$ "0", to the gates 659, 6513, and 6517 and opens these gates 659, 6513, and 6517. Thereby, the 7-bit data within the delete character bit register 653 are read in the delete character bit shift register 658, the 7-bit data within the insertion character bit register 6515 in the insertion character shift register 6516, and also the insert items within the insert item register 6511, in the replacement shift register 6514, respectively.

Here, suppose the delete items are of two characters, and the insert items are of three characters. The delete items are registered in the 6th and 7th stages, 2S6 and 2S7, of the delete item register 652, and the insert items are registered in the 5th, 6th and 7th stages of the insert item register 6511, respectively. And, at the point of time when the read of the foregoing 7-bit data and insert items has been completed, deletion items are present in the 6th and 7th stages, 4S6 and 4S7, of the data shift register 654, and insertion items are present in the 5th, 6th and 7th stages of the replacement register 6514. Furthermore at this time, in the delete character bit shift register 658, each bit of the 6th and 7th stages, 8S6, 8S7 is "1", and in the insertion character bit register 6516, each bit of the 5th, 6th and 7th stages, 16S5, 16S6 and 16S7, is "1". Therefore, since the input signals A, B, and C of the control and operation unit 6518 are "1, 1, and 1", in reference to FIG. 8, the output signals $Q_1$, $Q_2$, $Q_3$, and $Q_4$ are "0, 0, 0, and 1" at the time of the next shift timing. As a result, because the gate 6522 is opened and further, the gate 6520 is closed, the leading character of the insert item output from the replacement shift register 6514 is sent to the data bus 81 and written in the second DRAM 71, and on the other hand, the leading character of the delete item output from the data shift register 654 is discarded.

Along with the output of the leading character, in the data shift register 654, the last character of the delete item is transferred to the 7th stage 4S7, and in the replacement shift register 6517, the remaining two characters of insertion items are transferred to the 6th and 7th stages, 14S6 and 14S7. Furthermore in the delete character bit shift register 658 the bit of the 7th stage 8S7 alone becomes "1", and in the insertion character bit shift register 6516, each bit of the 6th and 7th stages 16S6 and 16S7 becomes "1". Consequently, since the signals A, B, and C become "1, 0, and 1", the signals $Q_1$, $Q_2$, $Q_3$, and $Q_4$ at the time of the next shift timing are "0, 1, 0, and 1". As a result the gates 6520 and 6522 are maintained in the same status as before, therefore the second character of the insertion item output from the replacement shift register 6514 is sent to the bus 81 and written in the second DRAM 71, and the last character of the delete item output from the data shift register 654 is discarded. Further, because the signal $Q_2$ becomes "1", the readout action of the first DRAM 31 and the shift action of the data shift register 654 and the delete character bit register 658 come to a halt.

With this shift action in a halt status the character data array subsequent to the delete item are stored in the data shift register 654 and the last character data of insert items are stored in the No. 7 stage 11S7 of the replacement shift register 6511. In the delete character bit shift register 658 all 7 bits are "0", and in the insertion character bit shift register 6516, only the bit in the 7th stage 16S7 is set to "1". Thus, since the signals A, B, and C are "0, 0, and 1", the signals $Q_1$, $Q_2$, $Q_3$ and $Q_4$ at the next shift timing are "0, 0, 0, and 1". As the result, because the gates 6520 and 6522 are in the same status as before, the last character of the insert items output from the replacement register 6514 is written in the second DRAM 71 via the data bus 81, and on the other hand, in the data shift register 654, due to the halt of the shift action, and the character data subsequent to the delete item are retained. And since the signal $Q_2$ becomes "0" again, the read-out action of the first DRAM 31 and the shift action of the data shift register 654 and delete character bit register 658 restart.

Hereafter, since all bits in both the deletion character bit shift register 658 and the insertion character bit register 6516 become "0", the output data from the data shift register 654 is, as in the operation at start, sent to the data bus 81 and written in the second DRAM 71.

In this way, when the insert item has a larger number of characters than in the delete item, the read-out action of the first DRAM 31 and the shift action of the data shift register 654 and delete character bit register 658 are halted in the interval from the output completion of the delete items to that of the insert items, and the sentence following the delete item is shifted backward by the excess number of characters.

Figure 10:
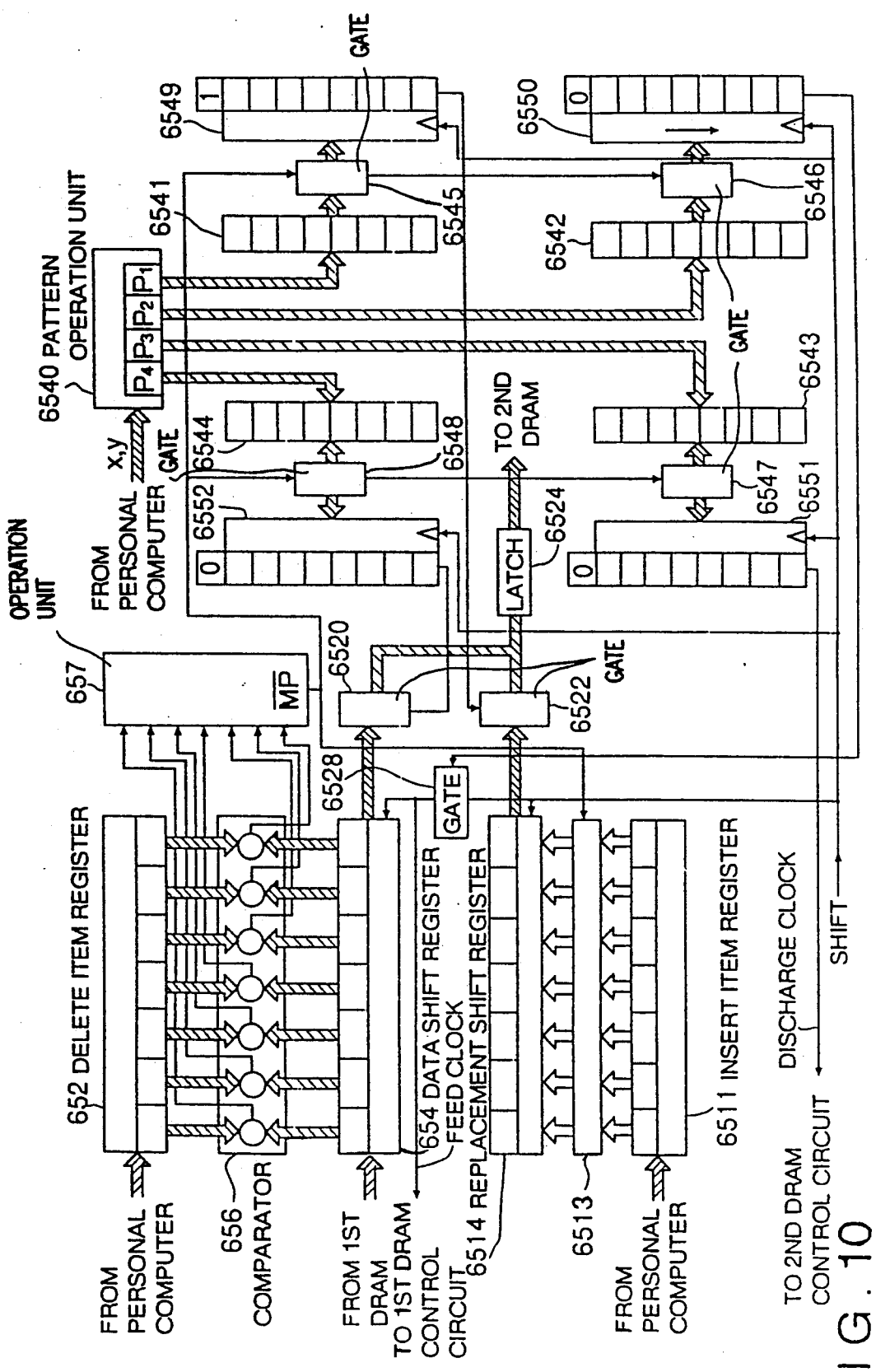
FIG. 10 is a block diagram showing the deformed example of the editing unit.

On the other hand, when the insert item has a fewer number of characters than the delete item, the signals A, B, and C become "0, 1, and 1" in the interval from right before the output completion of the insert item to that of the delete item. Consequently, because in the interval from the output completion of the insert items to that of the delete items, the signals $Q_1$, $Q_2$, $Q_3$ and $Q_4$ become "1, 0, 1, and 1", only the read-out operation of the first DRAM 31 and the shift operation of the data shift register 654 and the delete character bit register 658 are carried out, and the write operation of the second DRAM 71 is halted. As a result the characters subsequent to the delete items are shifted forward by the deficient number of characters. FIG. 10 shows another configuration of the editing unit 65. In this figure the elements are affixed with the same reference signs as FIG. 1.

As already described, when the delete items and insert items differ in length, the timing of supplying character arrays from the fist DRAM 31 to the editing unit 65 and the timing of discharging character arrays from the editing unit 65 to the second DRAM 71 have to be controlled. In the above-mentioned editing unit of FIG. 7 the above control is conducted on the basis of the results of operation procedure made every time one character is shifted after the same character array as that of the delete item is found.

In the editing unit of FIG. 10, in contrast, at the moment when the delete items and insert items are registered, the procedural pattern of the foregoing control is determined on the basis of the length of these character arrays. As a result, it becomes unnecessary to perform an operation for every character shift, thereby making the structure simple, and improving the processing speed.

The editing unit 65 in FIG. 10 is detailed below according to the processing order.

First, in the editing preparation step, the delete item and insert item are stored respectively in the registers 652 and 6511. And, from the personal computer to the pattern operation unit 6540 are given the delete item length (number of characters) x and the insert item length (number of characters) y. Based on the delete item length x and the insert item length y, the pattern operation unit 6540 calculates:

(a) ON/OFF pattern of the output gate 6522 of the replacement shift register 6514:$P_1$ (b) ON/OFF pattern of supply clock to supply character arrays from the first DRAM 31 to the editing unit 65:$P_2$ (c) ON/OFF pattern of discharge clock to discharge character arrays from the editing unit 65 to the second DRAM 71:$P_3$ (d) ON/OFF pattern of output gate 6520 of the data shift register 654:$P_4$, and stores these patterns (eight-bit numeric arrays in this embodiment) $P_1$-$P_4$ respectively in registers 6541, 6542, 6543 and 6544.

For instance, when the delete item is composed of seven characters or less and insertion character array is of six characters or less, the operation equation of these patterns becomes as follows provided that the delete item length is token as x, and the insert item length as y.

(I) In the case $x \leq y$.

$$P_1 = 256 - 2^y$$

$$P_2 = (2^y - 2^x)/2$$

$$P_3 = 0$$

$$P_4 = 2^y - 1$$

(II) In the case $X > y$, $$P_1 = 256 - (2^x + 2^y)/2$$

$$P_2 = 0$$

$$P_3 = (2^x - 2^y)/2$$

$$P_4 = 2^x - 1$$

Furthermore the operation of the foregoing pattern and the storage in the register may be effected, instead of the editing preparation step, right after the start of the editing execution step.

By the operation start signal from the personal computer 3, the editing execution step is started.

In the editing execution step, character arrays are transmitted in synchronism with the shift signal SHIFT from the first DRAM 31 to the data shift register 654.

Like the preceding embodiment, the character arrays in the data shift register 654 are compared with the delete items in the delete item register 652.

When the comparison results in a coincidence, and the match pulse MP is output, the gates 6545, 6546, 6547 and 6548 are opened, in synchronism with the next shift signal SHIFT, thereby the patterns $P_1$, $P_2$, $P_3$, and $P_4$ in the registers 6541, 6542, 6543, and 6544 are transferred respectively to the shift registers 6549, 6550 6551, and 6552. Moreover, only at the time of the initial shift signal SHIFT (viz. at the time of the foregoing transfer) after the output of the match pulse MP, both the supply clock and discharge clock are stopped.

In synchronism with each succeeding shift signal SHIFT, the shift registers 6549-6552 shift the respective transferred patterns $P_1$-$P_4$ downward in the figure. The least significant bits of each of the Shift registers 654-6552 are directly connected with the ON/OFF control circuits of the corresponding gates or clocks. When the value of the least significant bit is "0", the corresponding gate opens or the clock is supplied. Conversely, when the value is "1", the corresponding gate closes, or no clock is supplied. According to the pattern $P_1$ shifted in the shift register 6549, the gate 6522 is ON/OFF- controlled. According to the pattern $P_2$ shifted in the shift register 6550, the supply clock is ON/OF- controlled. According to the pattern $P_3$ shifted in the shift register 6551, the discharge clock is ON/OFF- controlled. Furthermore, according to the pattern $P_4$ shifted in the shift register 6552, the gate 6520 is ON/OFF- controlled.

While the patterns $P_1$-$P_4$ are shifted in the shift registers 6549-6552, the following values are input in the most significant bits of these shift registers 6549-6552.

(a) In the shift register 6549 . . . "1"

(b) In the shift register 6550 . . . "0"

(c) In the shift register 6551 . . . "0"

(d) In the shift register 6552 . . . "0"

Thus the character arrays where the insert items are substituted for delete items are output from the editing unit, and the processing against the difference of character numbers between both items is automatically performed.

In the embodiment explained above, the retrieval or editing work is all executed with hardware without depending on software at all. Therefore, an extremely high processing speed can be achieved. For example, in the embodiment of FIG. 1 the time required for retrieval per character is around twice the memory access time. That is, since the current memory access time is around 50 ns, the time required for retrieval per character is as extremely short as around 100 ns. An experiment with a machine of trial manufacture on a 210,000-character novel (equivalent to a pocket book of about 300 pages) showed a result of retrieving the name of the hero in around 0.02 second. If a further reduction of the processing time is desired, the file may be divided into a plurality of divisions to be input into a plurality of devices, and these devices should be driven in parallel. Since the processing time is extremely short as above, the fabrication of data bases is no longer needed, and even in the case of checking up all characters from the top to the end of files, the processing can be completed in a markedly shorter time than with the conventional apparatus.

INDUSTRIAL APPLICABILITY

The high-speed processing performance of this apparatus in the embodiment of this invention facilitates realization of sophisticated artificial intelligence such as an automatic translating machine, a voice recognition system and an expert system. Namely, by inputting the cause vo, effect information required by such an artificial intelligence in a large quantity, the embodiment of this invention will pick up the relative file in a short time and output readily the result to correspond with the cause. Thereafter, selection may be made from several output results with a proper standard. Furthermore, because the rewrite of files can be made with this apparatus in a very short time, at is possible to perform in real time and easily, for example, the management of inventories and reservation conditions that vary every moment.

We claim:

1. A retrieval unit for an information retrieval apparatus for retrieving desired information from files, which comprises:

a shift register having a predetermined number of stages for receiving and transferring file data read out of a file, a key register having a predetermined number of stages for registering retrieval data, each of said stages of said key register corresponding to a stage of the shift register, a comparator for comparing retrieval data in each stage of the key register with file data in each corresponding stage of the shift register, the comparator providing a comparison result signal indicating the result of each comparison of retrieval data in a stage of the key register with the file data in a corresponding stage of the shift register, a mask register for registering mask data having bits corresponding to each stage of the key register, and a logical operation circuit for performing a predetermined logical operation upon the comparison result signals and the mask data and for generating and sending out, on the basis of a result of the predetermined logical operation, a match signal indicating coincidence or mismatch of retrieval key data in the key register with file data in the shift register.

2. A retrieval unit for an information retrieval apparatus in accordance with claim 1, wherein the logical operation circuit generates a match pulse at a predetermined logical value only at the time the retrieval key data is determined to coincide with the file data, and a match latch latched to a predetermined logical value after the retrieval key data is determined to coincide with the file data.

3. An information retrieval apparatus as claimed in claim 1 further comprising:

a plurality of retrieval units as claimed in claim 1, a file memory for storing file data, an address memory for storing addresses of the file memory, a data transmission line for transmitting file data from the file memory to a data input terminal of the shift register, a coincidence operation circuit for generating a coincidence signal on the basis of match signals from the retrieval units;

an address transmission line for transmitting addresses of the file memory to a data terminal of the address memory, and an address memory control circuit for providing the address memory with a write command in response to a coincidence signal.

4. An information retrieval apparatus as claimed in claim 3, wherein the plurality of retrieval units are arranged so as to be alternately connectable in parallel or in series with the data transmission line.

5. An information retrieval apparatus as claimed in claim 3, wherein the logical operation circuit of each retrieval unit generates a match pulse at a predetermined logical value only at the time the retrieval key data is determined to coincide with the file data, and a match latch latched to a predetermined logical value after the retrieval key data is determined to coincide with the file data.

6. An information retrieval apparatus as claimed in claim 5, further including a record symbol detecting circuit for checking whether or not file data read out of the file memory is in coincidence with a predetermined record symbol, and a latch circuit inserted in the address transmission circuit, the record symbol detecting circuit, the coincidence operation circuit and the latch circuit be arranged to selectively operate in either a character retrieval mode or a record retrieval mode, such that, when the character retrieval mode is selected, the retrieval units are serially connected to the data transmission line, the coincidence operation circuit generates a coincidence signal which becomes a specific logical value when all of the match pulses have a predetermined logical value, the latch circuit gives the address signal a constant delay time, the address memory control circuit outputs a write command in response to a specific logical value of the coincidence signal, and when the record retrieval mode is selected, the retrieval units are connected in parallel to the data transmission line, the coincidence operation circuit carries out the logical operation predetermined according to the logical property of the retrieval key and outputs, as the coincidence signal, the result of the logical operation at the time the record symbol detection circuit detects the coincidence, the latch circuit latches the input address signal when the record symbol detecting circuit detects the coincidence, and outputs the previously latched address signal, and the address memory control circuit outputs a write command in response to the specific logical value of the coincidence signal.

7. An information editing unit for retrieving and deleting desired information from files, and inserting, in place of the information, other information, comprising:

a data shift register having a predetermined number of stages to receive and transfer file data read out from a first file memory, a delete item register having a predetermined number of stages for registering delete item data, a delete character bit register for registering delete character bit data having bits corresponding to each stage of the delete item register and in which only bits corresponding to stages of the delete item register in which delete item data is registered are made a predetermined logical value, a comparator for comparing delete item data in each stage of the delete item register with file data in a corresponding stage of the data shift register, the comparator providing a comparison result signal indicating the result of each comparison of delete item data in a stage of the delete item register with file data in a corresponding stage of the data shift register, a logical operation circuit for generating match pulses based upon predetermined logical operations on each comparison result signal output from the comparator and on the delete character bit data in the delete character bit register, a delete character bit shift register for reading and storing delete character bit data in the delete character bit register in response to a match pulse from said logical operation circuit, an insert item register having a predetermined number of stages for registering insert data, a replacement data shift register having a predetermined number of stages for reading and storing insert item data from each stage of the insert item shift register in response to a match pulse from said logical operation circuit, an insertion character bit register for registering insertion character bit data having bits corresponding to each stage of the insert item register, and in which only bits corresponding to a stage in which insert item data has been registered are made a predetermined logical value, an insertion character bit shift register for reading and storing insertion character bit data from the insertion character bit register in response to a match pulse from said logical operation circuit, a gate for selectively passing either output from the data shift register or data output from the replacement shift register, a control signal operation circuit for generating control signals to control read-out timing of a first memory, shift timing of the data shift register and delete character bit register, shift timing of the replacement shift register and inserting character bit shift register, write timing of a second file memory, and selection timing of the gate by carrying out a predetermined logical operation on the data in the delete character bit shift register and the data in the insertion character bit shift register, so as to control the gate so selectively pass either data output from the data shift register or data output from the replacement shift register.

8. An information editing unit as recited in claim 7, further including:

a first memory file for storing files and supplying data to the data shift register; and a second memory file for storing data passed by the gate.

9. An information editing apparatus as claimed in claim 7, further comprising:

(a) a plurality of retrieval units, each of said retrieval units including a shift register having a predetermined number of stages for receiving and transferring file data read out of a file, a key register having a predetermined number of stages for registering retrieval data, each of said stages of said key register corresponding to a stage of the shift register, a comparator for comparing retrieval data in each stage of the key register with file data in each corresponding stage of the shift register, the comparator providing a comparison result signal indicating the result of each comparison of retrieval data in a stage of the key register with the file data in a corresponding stage of the shift register, a mask register for registering mask data having bits corresponding to each stage of the key register, and a logical operation circuit for performing a predetermined logical operation upon the comparison result signals and the mask data and for generating and sending out, on the basis of a result of the predetermined logical operation, a match signal indicating coincidence or mismatch of retrieval key data in the key register with file data in the shift register.

(b) a plurality of information editing units;

(c) a file memory for storing file data, (d) an address memory for storing addresses of the file memory, (e) a coincidence operation circuit for generating a coincidence signal on the basis of match signals from the retrieval units;

(f) a data transmission line for transmitting file data from the file memory to a data input terminal of the shift register, (g) an address transmission line for transmitting addresses of the film memory to a data terminal of the address memory, and (h) an address memory control circuit for providing the address memory with a write command in response to either a coincidence signal from said coincidence operation circuit or a control signal from said control signal operation signal.

10. An information editing apparatus for retrieving and deleting desired data, and for inserting replacement data in the place desired data, comprising:

a data shift register having a predetermined number of stages for receiving and transferring file data read out of a first file memory, a delete item register having a predetermined number of stages for registering delete item data, a comparator for comparing file data in each stage of the delete item register with delete item data in a corresponding stage of the data shift register, the comparator providing a comparison result signal indicating the result of each comparison of delete item data in a stage of the delete item register with file data in a corresponding stage of the data shift register, a logical operation circuit for generating a match pulse based on each comparison result signal output from the comparator, a delete data shift register having a predetermined number of stages for reading and storing data in each stage in the insert item register in response to a match pulse from the logical operation circuit, a gate for selectively passing either data output from the data shift register data or data output from the replacement shift register, and a timing control circuit for controlling a mutual relationship of an operation timing of the gate passing selectively the data output from the data shift register or the data output from the replacement shift register, read-out timing of a first memory, shift timing of the data shift register, and write timing of a second memory, so as to control the gate to selectively pass data output from the data shift register or the data output from the replacement shift register to a second memory.

11. An information editing apparatus as recited in claim 10, further including:

a first memory file for storing files and supplying data to the data shift register; and a second memory filed for storing data passed by the gate.

* * * * *